United States Patent [19]

Saida et al.

[11] Patent Number: 5,688,873
[45] Date of Patent: Nov. 18, 1997

[54] ELECTROCONDUCTIVE POLYMER AND PROCESS FOR PRODUCING THE POLYMER

[75] Inventors: Yoshihiro Saida; Yoshiaki Ikenoue, both of Chiba; Reiko Ichikawa, Osaka, all of Japan

[73] Assignee: Showa Denko K.K., Tokyo, Japan

[21] Appl. No.: 474,413

[22] Filed: Jun. 7, 1995

Related U.S. Application Data

[63] Continuation-in-part of Ser. No. 251,297, May 31, 1994, abandoned, and Ser. No. 985,339, Dec. 4, 1992, abandoned.

[30] Foreign Application Priority Data

| Dec. 4, 1991 | [JP] | Japan | 3-348295 |
| Nov. 24, 1992 | [JP] | Japan | 4-336672 |
| May 31, 1993 | [JP] | Japan | 5-129798 |

[51] Int. Cl.⁶ .................. C08G 63/91; C08G 65/32
[52] U.S. Cl. ................ 525/410; 525/417; 525/535; 525/540; 528/380; 528/388; 528/417; 528/423; 528/424
[58] Field of Search ............... 525/410, 417, 525/535, 540; 528/380, 388, 417, 423, 424

[56] References Cited

U.S. PATENT DOCUMENTS

| 4,833,231 | 5/1989 | Yoshida et al. |
| 4,880,508 | 11/1989 | Aldissi. |
| 4,954,594 | 9/1990 | Yoshida et al. |
| 5,115,057 | 5/1992 | Ono et al. |
| 5,256,454 | 10/1993 | Murai et al. |

FOREIGN PATENT DOCUMENTS

| 0164974 | 12/1985 | European Pat. Off. |
| 0273643 | 7/1988 | European Pat. Off. |
| 0399463 | 11/1990 | European Pat. Off. |
| 63-307604 | 12/1988 | Japan. |
| 2-242816 | 9/1990 | Japan. |
| 2-252727 | 10/1990 | Japan. |
| 2258832 | 10/1990 | Japan. |
| 2258833 | 10/1990 | Japan. |
| 87 05914 | 10/1987 | WIPO. |

OTHER PUBLICATIONS

*Journal or American Chemical Society*, vol. 109, p. 1858, 1987.
*Polymer Bulletin*, vol. 18, p. 277, 1987.
*Journal of Chemical Society, Chemical Communication*, p. 621, 1987.
*Journal of Chemical Society, Chemical Communication*, p. 180, 1990.
*Synthetic Metals*, vol. 31, p. 369, 1989.
*Journal of Americain Chemical Society*, vol. 112, p. 2800, 1990.
*Journal of Organic Chemistry*, vol. 49, p. 33882, 1984.
*Journal of Chemical Physics*, vol. 85, p. 4673, 1986.
*Journal of American Chemical Society*, vol. 110, p. 2983.
*Journal of American Chemical Society*, vol. 113, p. 7411, 1991.
*Journal of Electrochemical Society*, vol. 137, p. 900, 1990.
*Polymer Communications*, vol. 32, p. 412, 1991.
*New Journal of Chemistry*, vol. 15, p. 233, 1991.
*Polymer Bulletin*, vol. 18, 1987, Heidelberg, DE pp. 277–281, E.E. Havinga et al., "Self–doped water–soluble conducting polymers."

Primary Examiner—Helen Lee
Attorney, Agent, or Firm—Sughrue, Mion, Zinn, Macpeak & Seas, PLLC

[57] ABSTRACT

Electroconductive polymers having a chemical structure represented by, for example, the formula (I)

$$\left(\begin{array}{c} R^2 \\ R^1 \diagup\!\!\!\diagdown (SO_3^- M)_m \\ \diagdown\!\!\!\diagup \\ X \end{array}\right)$$  (I)

wherein $R^1$ and $R^2$ independently represent H, a $C_1$ to $C_{20}$ alkyl or alkoxy group, an amino group, a trihalomethyl group or a phenyl group, X represents S, O, Se, Te or $NR_3$ $R_3$ represents H, a $C_1$ to $C_6$ alkyl group or an aryl group, M represents a cation such as $H^+$, an alkali metal ion or a quaternary ammonium ion, and m is 0.2 to 2 and a process for producing the polymer.

4 Claims, 7 Drawing Sheets

ELECTROCONDUCTIVE POLYMER AND PROCESS FOR PRODUCING THE POLYMER

CROSS-REFERENCE TO RELATED APPLICATION

This application is a continuation-in-part of application Ser. No. 08/251,297, filed May 31, 1994, and of application Ser. No. 07/985,339, filed Dec. 4, 1992, both are now abandoned.

BACKGROUND OF THE INVENTION

1. Field of the Invention

The present invention in one embodiment relates to an electroconductive polymer having a high stability and exhibiting high solubility in water and also relates to a process for producing the polymer. More specifically, the present invention in this embodiment relates to a water-soluble electroconductive polymer particularly suitable for use as electrodes, sensors, electronic display elements, nonlinear-optical elements, photoelectric conversion elements, antistatic agents, conducting materials, and optical materials which require high workability in the field of electric and electronic industry and a process for producing the polymer.

The present invention in another embodiment relates to an extremely stable electroconductive polymer having high solvent solubility and to a process for producing the polymer. More specifically, the present invention relates to the polymer and to a process for producing an electroconductive polymer particularly suitable as an electrode, a sensor, an electronics display element, a non-linear optical element, a photoelectric conversion element, or an antistatic agent, which encounters severe processability requirements in the field of electric and electronic industries, as well as being suitable for various electroconductive or optical materials.

2. Description of the Related Art

Polymers of an advanced electron conjugate system have attracted attention in industries concerned due to their characteristics such as not only conductivity but also behavior manifested in the change of state during the metal/semiconductor transition. Thus, studies have been made with a view to developing these polymers suitable for varying applications. Among other polymers of this class, water-soluble self-doping conjugate type polymers which are obtained by having a Brönsted acid group joined to the main chain of polymer by covalent bond either directly or indirectly with the aid of a spacer have arrested a particular interest in respect that they possess stable electroconductivity over a long period without needing contribution of any external dopant.

Specific examples thereof include a polythiophene derivative having an alkanesulfonic acid group (F. Wudl et al., *Journal of American Chemical Society*, vol. 109, p. 1858, 1987; and E. E. Havinga et al., *Polymer Bulletin*, vol. 18, p. 277, 1987), a polythiophene derivative or a polypyrrole derivative (Aldissi, U.S. Pat. No. 4,880,508), a polymer having an alkanesulfonic acid group or an alkylcarboxyl acid group as a substituent in an aromatic ring of polyaniline (WO 87/05914; JP-A-63-39916), a polymer having a propanesulfonic acid group substituted at the N-position of pyrrole (*J. Chem. Soc., Chemical Communication*, p. 621, 1987), a polyaniline derivative having a propanesulfonic acid group substituted at the N-position (*J. Chem. Soc., Chemical Communication*, p. 180, 1990 and *Synthetic Metals*, vol. 31, p. 369, 1989), a polyaniline derivative having a sulfonic acid group substituted directly on the aromatic ring (*J. Am. Chem. Soc.*, vol. 112, p. 2800, 1990), and a polycarbazole derivative having an alkanesulfonic acid group substituted at the N-position (U.S. Pat. No. 5,130,412). In addition, their production processes are also disclosed in these publications.

Furthermore, an oxidative chemical polymerization of a thiophene derivative monomer having an alkanesulfonic acid group is disclosed in JP-A-2-189333.

Further, among condensed heteropolycyclic compounds, isothianaphthene, benzo[c]furan, and naphtho[2,3-c]thiophene, each having a π-conjugated quinoid structure, are known to have a very high reactivity, and require specific procedures for their isolation (see, *J. Org. Chem.*, vol. 36, p. 3932, 1971, and *Recl. Tray. Chim. Pays-Bas*, vol. 87, p. 1006, 1968).

As a specified example of bicyclic conducting polymers, polyisothianaphthene is disclosed in conjunction with a method for the production thereof in *J. Org. Chem.*, 49, 3382 (1984), in which it is described to possess a stable conductivity as evidenced by an extremely small energy gap of 1.1 eV. However, polyisothianaphthene is neither soluble nor fusible and is extremely deficient in moldability. A method for rendering this particular polymer soluble in an organic solvent by introducing an alkyl group or alkoxy group into the polymer is disclosed in JP-A-2-242816. The term "JP-A" as used herein means an "unexamined published Japanese patent application".

The thought that the conductivity of such isothianaphthene polymers is further influenced by introducing an electron attracting or donating group into the isothianaphthene backbone has been reported in conjunction with results of calculation by Bredas et al. in *J. Chem. Phys.*, 85(8), 4673 (1986). As examples of the polymers relating to such isothianaphthene polymers, polymers having a halogen atom as a substituent as disclosed in JP-A-63-307604 and polymeric compounds possessing an isothianaphthene backbone having an electron attracting group as a substituent as described in JP-A-02-252727 may be cited. A process for producing a polymer having a naphtho[2,3-c]thiophene structure, which is a heterotricyclic electroconductive polymer that is neither soluble nor fusible, has been reported in *Synthetic Metals*, vol. 35, p. 263, 1990. The oxidative chemical polymerization of 1,3-dihydroisothianaphthene without a sulfonic acid group is disclosed, for example, in JP-A-63-118323 and U.S. Pat. No. 4,789,748. Bicyclic water-soluble conducting polymers, having an isothianaphthenylene structure, an isobenzofurylene structure, an isoindolylene structure, an isobenzoselenylene structure, or an isobenzotellurylene structure as a repeating unit thereof, have never been disclosed to the art to date. Neither of these patent publications has any specific disclosure of the polymer having a sulfonic acid group on repeating unit of the present invention nor of a method for the production of such a polymer.

SUMMARY OF THE INVENTION

Accordingly, a first object of the present invention is to eliminate the above-mentioned disadvantages of the prior art and to provide a practical and novel bicyclic water-soluble electroconductive polymer derived from a known compound, a process for producing the polymer and an article processed therefrom.

A further object of the present invention is to provide an electroconductive polymer and a process for producing an electroconductive polymer comprising a condensed heteropolycyclic monomer unit having a sulfonic acid group by polymerizing a sulfonic acid group-containing condensed heteropolycyclic compound as a starting material.

Another object of the present invention is to provide a process for producing an electroconductive polymer comprising a condensed heteropolycyclic monomer unit having a sulfonic acid group by polymerizing a sulfonic acid group-containing condensed heteropolycyclic compound as a starting material alone or together with another aromatic compound and/or heterocyclic compound and/or compound capable of forming a π-electron conjugated structure.

Other objects and advantages of the present invention will be apparent from the following description.

In accordance with a first embodiment of the present invention, there is provided a water-soluble electroconductive polymer having a chemical structure represented by the formula (I):

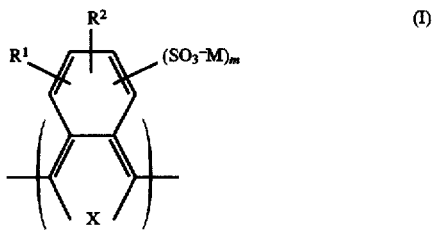

wherein $R^1$ and $R^2$ independently represent a hydrogen atom, a linear or branched alkyl or alkoxy group having 1 to 20 carbon atoms, a primary, secondary or tertiary amino group, a trihalomethyl group, a phenyl group or a substituted phenyl group, X represents S, O, Se, Te or $NR^3$, $R^3$ represents a hydrogen atom, a linear or branched alkyl group having 1 to 6 carbon atoms or a substituted or unsubstituted aryl group, providing that the chain in the alkyl group of $R^1$, $R^2$ or $R^3$ or in the alkoxy group of $R^1$ or $R^2$ optionally contains a carbonyl, ether or amide bond, M represents $H^+$, an alkali metal ion such as $Na^+$, $Li^+$ or $K^+$ or a cation such as a quaternary ammonium ion, and m represents a numerical value in the range between 0.2 and 2.

In accordance with a second embodiment of the present invention, there is also provided a water-soluble electroconductive polymer having a chemical structure represented by the formula (II):

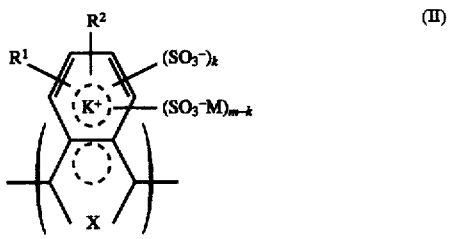

wherein $R^1$, $R^2$, X, $R^3$, M, and m have the same meanings as defined above with respect to the formula (I) and k is a numerical value smaller than that of m, and/or the formula (III):

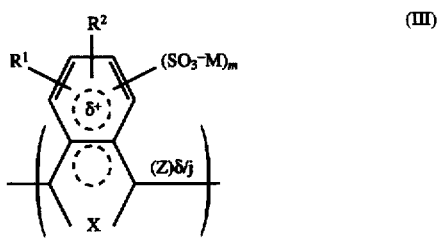

wherein $R^1$, $R^2$, X, $R^3$, M, and m have the same meanings as defined above with respect to the formula (I), δ is a numerical value not more than 0.7, Z represents an anion, and j represents a numerical value 1 or 2 indicating the valency of the anion Z, as obtained by electrochemically and/or chemically doping the above-mentioned polymer having a chemical structure represented by the formula (I).

In accordance with a third embodiment of the present invention, there is provided a process for producing the water-soluble electroconductive polymer mentioned above, which process comprises reacting a sulfonating agent with a compound having the formula (IV):

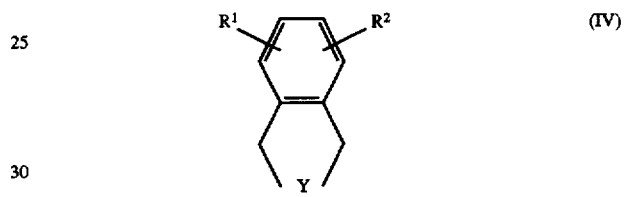

wherein $R^1$, $R^2$, and $R^3$ have the same meanings as defined above with respect to the formula (I) and Y represents S, O, Se, Te, S=O, Se=O, Te=O or $NR^3$ and the general formula (V):

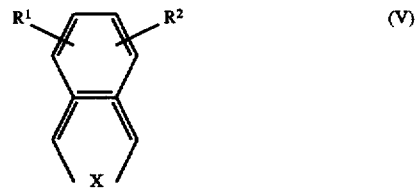

wherein $R^1$, $R^2$, X and $R^3$ have the same meanings as defined above with respect to the formula (I) or on at least one compound selected from the compounds mentioned above.

The present invention in a fourth embodiment provides an electroconductive polymer comprising at least one structural unit represented by formula (VII) as a repeating unit and a process for producing such, which comprises polymerizing a compound represented by formula (VI):

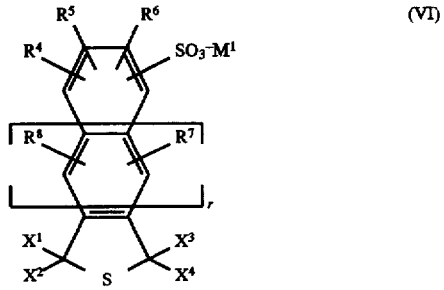

wherein $R^4$, $R^5$, $R^6$, $R^7$ and $R^8$ each independently represents a monovalent group selected from the group consisting of a hydrogen atom, a linear or branched, saturated or unsaturated alkyl, alkoxy, or alkyl ester group each having from 1 to 20 carbon atoms, preferably from 1 to 12 carbon atoms, $SO_3^-M^1$, a halogen atom, a nitro group, a cyano group, a primary, secondary or tertiary amino group, a trihalomethyl group, and a substituted or unsubstituted phenyl group, with the proviso that two or more of $R^4$, $R^5$, $R^6$, $R^7$ and $R^8$ are not $SO_3^-M^1$ simultaneously, wherein the hydrocarbon chain represented by $R^4$, $R^5$, $R^6$, $R^7$ or $R^8$ may combine with each other at any optional position to form at least one divalent chain which forms, together with two carbon atoms of the substituted ring, at least one 3- to 7-membered saturated or unsaturated hydrocarbon ring structure, and the alkyl group, the alkoxy group, or the alkyl ester group represented by $R^4$, $R^5$, $R^6$, $R^7$ and $R^8$, or the cyclic hydrocarbon chain formed therefrom may optionally have a bond giving rise to a carbonyl, ether, ester, amide, sulfide, sulfinyl, sulfonyl or imino moiety; wherein $X^1$, $X^2$, $X^3$ and $X^4$ each independently represents a hydrogen atom or a halogen atom; wherein $M^1$ represents $H^+$, an alkali metal ion, such as $Na^+$, $Li^+$ and $K^+$, or a cation of a Vb Group element unsubstituted or substituted with an alkyl group having from 1 to 30 carbon atoms, preferably from 1 to 20 carbon atoms, and more preferably from 1 to 12 carbon atoms, or with an aryl group having from 6 to 30 carbon atoms, preferably from 6 to 20 carbon atoms, more preferably from 6 to 16 carbon atoms, such as $NH_4^+$, $NH(CH_3)_3^+$, $N(CH_3)_4^+$, $NH(C_2H_5)_3^+$, $N(C_6H_5)_4^+$, $PH_4^+$, $P(CH_3)_4^+$, $P(C_6H_5)_4^+$, $AsH_4^+$, $As(CH_3)_4^+$ and $As(C_6H_5)_4^+$; and wherein r represents an integer of from 0 to 3, and indicates the number of condensed rings enclosed by the dihydrothiophene ring and the benzene ring having substituents $R^4$, $R^5$ and $R^6$, wherein the condensed ring in the formula may optionally contain nitrogen or an N-oxide:

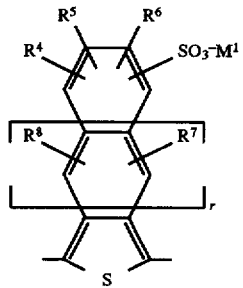
(VII)

wherein $R^4$, $R^5$, $R^6$, $R^7$, $R^8$, $M^1$ and r each has the same meaning as defined above.

The present invention in a fifth embodiment also provides a process for producing an electroconductive polymer comprising a chemical structure represented by formula (VIII):

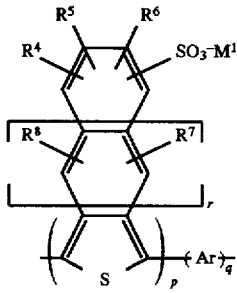
(VIII)

wherein $R^4$, $R^5$, $R^6$, $R^7$, $R^8$, $M^1$ and r each has the same meaning as described above, Ar represents a repeating unit of a π-electron conjugated system having no sulfonic acid group, p and q represent molar fractions of the respective repeating units in the copolymer, and thus do not denote a block copolymer and a process for producing such by polymerizing a compound represented by formula (VI), wherein $R^4$, $R^5$, $R^6$, $R^7$, $R^8$, $X^1$, $X^2$, $X^3$, $X^4$, $M^1$ and r each has the same meaning as described above, alone or together with another aromatic compound and/or heterocyclic compound and/or compound capable of forming a π-electron conjugated structure.

The present invention further provides in a sixth embodiment an electroconductive polymer comprising a chemical structure represented by formula (IX):

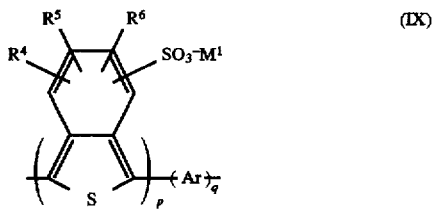
(IX)

wherein $R^4$, $R^5$, $R^6$, $M^1$, Ar, p and q each has the same meaning as described above, by polymerizing a compound represented by formula (VI), wherein $R^4$, $R^5$, $R^6$, $R^7$, $R^8$, $X^1$, $X^2$, $X^3$, $X^4$ and $M^1$ each has the same meaning as described above and r is 0, alone or together with another aromatic compound and/or heterocyclic compound and/or compound capable of forming a π-electron conjugated structure.

BRIEF DESCRIPTION OF THE DRAWINGS

The present invention will be better understood from the description set forth below with reference to the accompanying drawings, wherein.

DETAILED DESCRIPTION OF THE INVENTION

Figure 1:
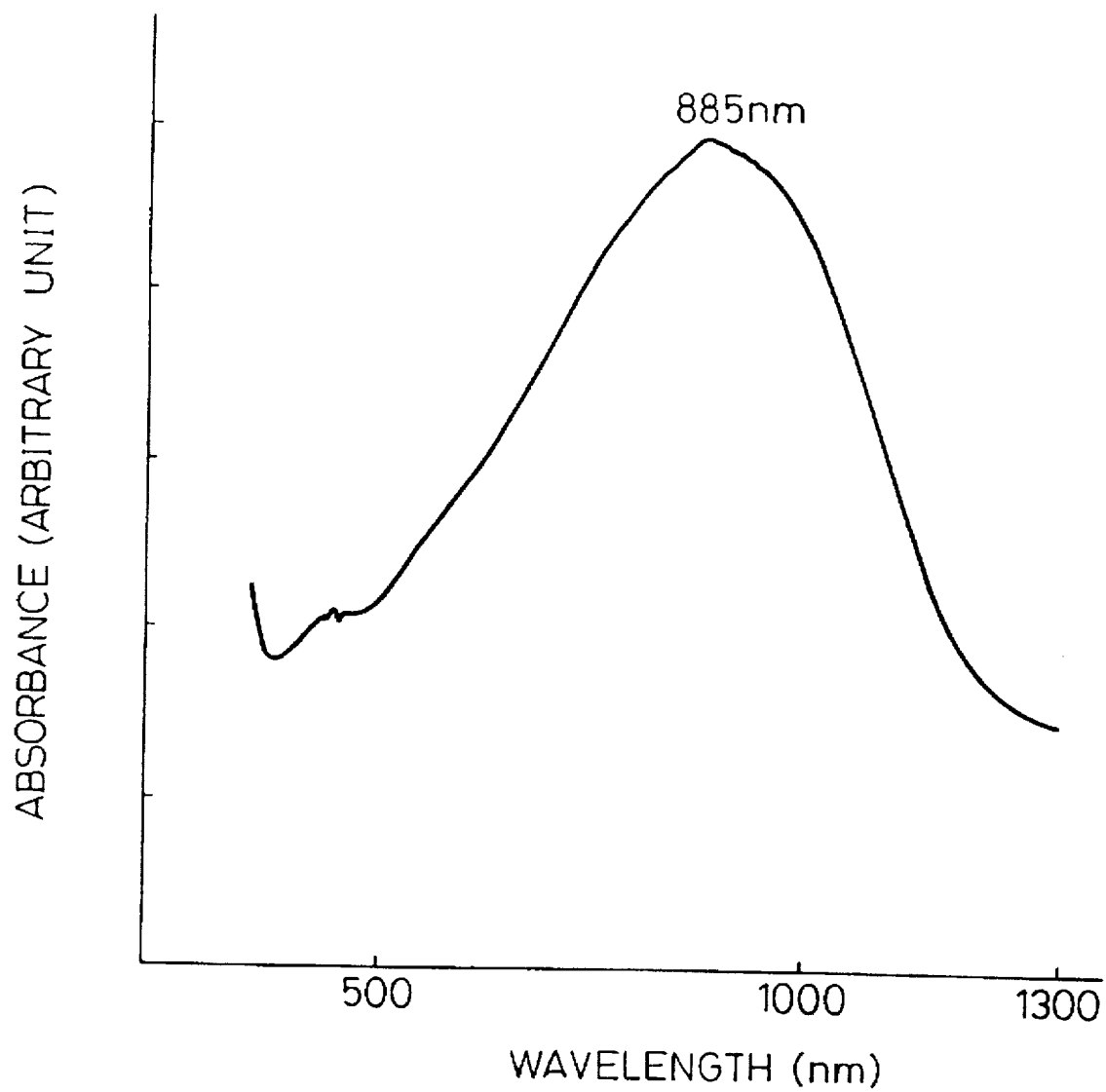
FIG. 1 is a UV spectrum of the polymer obtained in Example 1.

The substituents $R^1$ and $R^2$ of the polymer having a chemical structure represented by the formula (I) according to the present invention are only required to be those inhibiting neither the reaction of sulfonation nor the polymerization reaction of monomers. For example, they are independently selected from those among a hydrogen atom, linear or branched alkyl or alkoxy groups having 1 to 20 carbon atoms, aliphatic or aromatic primary, secondary or tertiary amino groups, trihalomethyl groups such as trichloromethyl, phenyl group, and substituted phenyl groups. Optionally, the above-mentioned alkyl or alkoxy groups may contain a carbonyl, ether, or amide bond in their chains having 1 to 20 carbon atoms.

Specific examples of $R^1$ and $R^2$ are hydrogen, alkyl groups and alkoxy groups. More specific examples of such alkyl groups include methyl, ethyl, propyl, isopropyl, butyl, pentyl, hexyl, octyl, dodecyl, methoxyethyl, ethoxyethyl, acetonyl, phenacryl and the like, and those of such alkoxy groups include methoxy, ethoxy, propoxy, isopropoxy, octyloxy, dodecyloxy and the like.

Other specific examples of $R^1$ and $R^2$ include amino groups such as methylamino, ethylamino, diphenylamino, anilino, and the like, trifluoromethyl group, phenyl group, tolyl group, xylyl group, acylamido groups such as acetoamido and the like.

The symbol m which means the ratio of substitution of "sulfo"-containing group at the benzene ring of the polymer represents a numerical value in the range between 0.2 and 2, and the range between 0.4 and 1.3 is preferably represented.

The symbol X in the formula (I) represents S, O, Se, Te or $NR^3$ and thus the chemical structure represented by formula (I) is a isothianaphthenylene, isobenzofurylene, isobenzoselenylene, isobenzotellurylene, or isoindolylene structure. The substituent $R^3$ mentioned above represents a linear or branched alkyl group having 1 to 6 carbon atoms or substituted or unsubstituted aryl group. The alkyl groups in the substituents $R^3$ may optionally contain a carbonyl, ether, or amide bond in its chain having 1 to 6 carbon atoms.

Specific examples of $R^3$ are hydrogen, methyl, ethyl, propyl, isopropyl, butyl, hexyl, phenyl, tolyl, methoxyethyl, ethyoxyethyl, acetonyl, acetyl and the like.

The symbol M represents $H^+$, an alkali metal ion such as $Na^+$, $Li^+$ or $K^+$, or a cation such as ammonium or an alkyl-substituted or aryl-substituted cation of Vb group element such as $N(CH_3)_4^+$ or $N(C_6H_5)_4^+$. The conversion to the specific cation is easily effected by means of an ordinary ion-exchange resin.

The condensed heteropolycyclic compound represented by formula (VI) is a compound wherein r of formula (VI), which indicates the number of the condensed rings enclosed by the dihydrothiophene ring and the benzene ring having substituents $R^4$, $R^5$ and $R^6$, is an integer of from 0 to 3, and the condensed rings of formula (VI) may optionally contain nitrogen or an N-oxide. Suitable examples include thieno[3,4-b]quinoxaline and thieno[3,4-b]quinoxaline-4,9-dioxide. The hydrocarbon chain represented by $R^4$, $R^5$, $R^6$, $R^7$ or $R^8$ may combine with each other at any optional position to form at least one divalent chain which forms, together with two carbon atoms of the substituted ring, at least one 3- to 7-membered saturated or unsaturated hydrocarbon ring structure. The alkyl group, the alkoxy group, or the alkyl ester group represented by $R^4$, $R^5$, $R^6$, $R^7$ and $R^8$, or the cyclic hydrocarbon chain formed therefrom may optionally have a bond giving rise to a carbonyl, ether, ester, amide, sulfide, sulfinyl, sulfonyl or imino.

Specific examples of the basic skeleton for the condensed heteropolycyclic compound represented by formula (VI) include 1,3-dihydroisothianaphthene (a compound where in formula (VI), r is 0, and $X^1$, $X^2$, $X^3$ and $X^4$ each is H), 1,3-dichloroisothianaphthene (a compound where in formula (VI), r is 0, $X^1$ and $X^3$ each is Cl, and $X^2$ and $X^4$ each is H), 1,1,3,3-tetrachloroisothianaphthene (a compound where in formula (VI), r in 0 and $X^1$, $X^2$, $X^3$ and $X^4$ each is Cl), 1,3-dihydronaphtho[1,2-c]thiophene (a compound where in formula (VI), r in 1, and $X^1$, $X^2$, $X^3$ and $X^4$ each is H), 1,3-dihydronaphtho[2,3-c]thiophene (a compound where in formula (VI), r is 1 and $X^1$, $X^2$, $X^3$ and $X^4$ each is H), 1,3-dichloronaphtho[2,3-c]thiophene (a compound where in formula (VI), r is 1 and $X^1$ and $X^3$ each is Cl, and $X^2$ and $X^4$ each is H), 1,3-dihydroanthra[1,2-c]thiophene (a compound where in formula (VI), r is 2, and $X^1$, $X^2$, $X^3$ and $X^4$ each is H), 1,3-dihydroanthra[2,3-c]thiophene (a compound where in-formula (VI), r is 2, and $X^1$, $X^2$, $X^3$ and $X^4$ each is H), 1,3-dihydrophenanthra[1,2-c]thiophene (a compound where in formula (VI), r is 2, and $X^1$, $X^2$, $X^3$ and $X^4$ each is H), 1,3-dihydrophenanthra[2,3-c]thiophene (a compound where in formula (VI), r is 2, and $X^1$, $X^2$, $X^3$ and $X^4$ each is H), 1,3-dihydrophenanthra[3,4-c]thiophene (a compound where in formula (VI), r is 2 and $X^1$, $X^2$, $X^3$ and $X^4$ each is H), 1,3-dihydrophenanthra[9,10-c]thiophene (a compound where in formula (VI), r is 2 and $X^1$, $X^2$, $X^3$ and $X^4$ each is H), 1,3-dihydronaphthaceno[1,2-c]thiophene (a compound where in formula (VI), r is 3 and $X^1$, $X^2$, $X^3$ and $X^4$ each is H), and 1,3-dihydronaphthaceno[2,3-c]thiophene (a compound where in formula (VI), r is 3 and $X^1$, $X^2$, $X^3$ and $X^4$ each is H), but the present invention should not be construed as being limited thereto.

Examples of the 3- to 7-membered saturated or unsaturated hydrocarbon cyclic structures formed by combining the hydrocarbon chain represented by $R^4$, $R^5$, $R^6$, $R^7$ or $R^8$ with each other at an optional position include 1,3-dihydroperylo[c]thiophene and 1,3-dihydroacenaphtho[c]thiophene structures, but the present invention should not be construed as being limited thereto.

Further, of the compounds represented by formula (VI), examples of the condensed heterocyclic compounds containing nitrogen in the condensed ring include the following compounds, but the present invention should not be construed as being limited thereto.

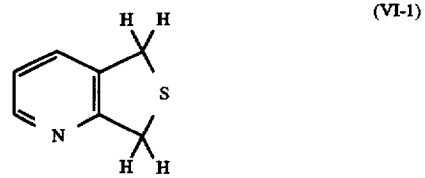
(VI-1)

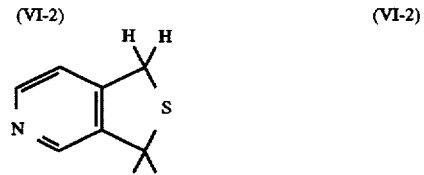
(VI-2)

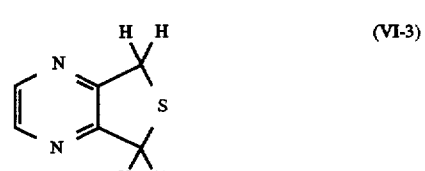
(VI-3)

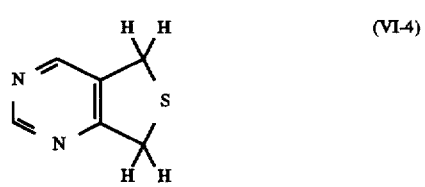
(VI-4)

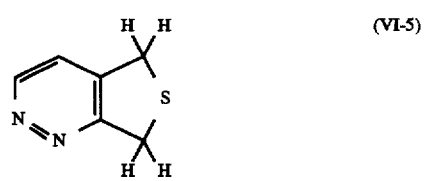
(VI-5)

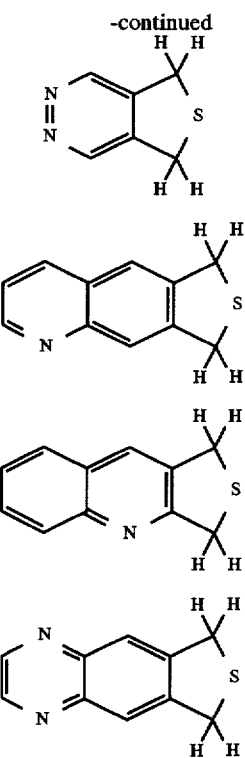

(VI-6)

(VI-7)

(VI-8)

(VI-9)

Preferred examples of the basic skeleton in the present invention include a compound having a 1,3-dihydroisothianaphthene structure represented by formula (X):

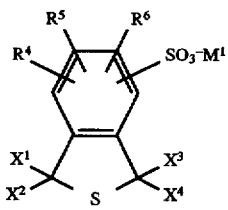

(X)

wherein $R^4$, $R^5$ and $R^6$ each independently represents a monovalent group selected from the group consisting of a hydrogen atom, a linear or branched, saturated or unsaturated alkyl, alkoxy or alkyl ester group each having from 1 to 20 carbon atoms, preferably from 1 to 12 carbon atoms, $SO_3^-M^1$, a halogen atom, a nitro group, a cyano group, a primary, secondary, or tertiary amino group, a trihalomethyl group, and a substituted or unsubstituted phenyl group, with the proviso that two or more of $R^4$, $R^5$ and $R^6$ are not $SO_3^-M^1$ simultaneously, the hydrocarbon chain represented by $R^4$, $R^5$ or $R^6$ may combine with each other at any optional position to form at least one divalent chain which forms, together with two carbon atoms of the substituted ring, at least one 3- to 7-membered saturated or unsaturated hydrocarbon ring structure, and the alkyl group, the alkoxy group, or the alkyl ester group represented by $R^4$, $R^5$ and $R^6$, or the cyclic hydrocarbon chain formed therefrom may optionally have a bond giving rise to a carbonyl, ether, ester, amide, sulfide, sulfinyl, sulfonyl or imino; $X^1$, $X^2$, $X^3$ and $X^4$ each independently represents a hydrogen atom or a halogen atom; $M^1$ represents $H^+$, an alkali metal ion, such as $Na^+$, $Li^+$ and $K^+$, or a cation of a Vb Group element unsubstituted or substituted with an alkyl group having from 1 to 30 carbons atoms, preferably from 1 to 20 carbon atoms, more preferably from 1 to 12 carbon atoms, or with an aryl group having from 6 to 30 carbon atoms, preferably from 6 to 20 carbon atoms, more preferably from 6 to 16 carbon atoms, such as $NH_4^+$, $NH(CH_3)_3^+$, $N(CH_3)_4^+$, $NH(C_2H_5)_3^+$, $N(C_6H_5)_4^+$, $PH_4^+$, $P(CH_3)_4^+$, $P(C_6H_5)_4^+$, $ASH_4^+$, $As(CH_3)_4^+$ and $As(C_6H_5)_4^+$, and a compound having a 1,3-dihydronaphtho[2,3-c]thiophene structure represented by formula (XI):

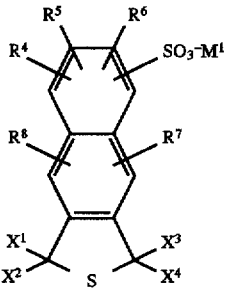

(XI)

wherein $R^4$, $R^5$, $R^6$, $R^7$, $R^8$, $X^1$, $X^2$, $X^3$, $X^4$ and $M^1$ each has the same meaning as in formula (VI).

Useful examples of the substituents $R^4$, $R^5$, $R^6$, $R^7$ and $R^8$ in formulae (VI), (VII), (VIII) and (XI), and the substituents $R^4$, $R^5$ and $R^6$ in formulae (IX) and (X) include a hydrogen atom, a halogen atom, $SO_3^-M^1$, a saturated alkyl group, an unsaturated alkyl group, a saturated alkoxy group, an unsaturated alkoxy group, a saturated alkyl ester group, an unsaturated alkyl ester group, a nitro group, and a cyano group. More specific examples of the substituents include chlorine, bromine, fluorine and iodine as a halogen atom, methyl, ethyl, propyl, isopropyl, butyl, t-butyl, pentyl, hexyl, octyl, dodecyl, tetradecyl, methoxyethyl, ethoxyethyl, (2-methoxy)ethyl, acetonyl, vinyl, 1-methylethenyl, 2-methylethenyl, 2-methylethenyl, crotonyl, allyl, phenyl, tolyl, xylyl, and phenacyl as the hydrocarbon chain of the saturated or unsaturated alkyl or alkyl ester group, and methoxy, ethoxy, (2-methoxy)ethoxy, propoxy, isopropoxy, hexyloxy, octyloxy, and dodecyloxy as the alkoxy group.

In addition to the foregoing, examples of the substituents include an amino group, such as methylamino, ethylamino, diphenylamino, and anilino, and a group, such as trifluoromethyl, chlorophenyl, and acetamide.

Useful examples of the substituents $X^1$, $X^2$, $X^3$ and $X^4$ in formulae (VI), (X) and (XI) include hydrogen, fluorine, chlorine, bromine, and iodine.

More specific examples of the compounds represented by formula (X) include 1,3-dihydroisothianaphthene-5sulfonic acid, 1,3-dichloroisothianaphthene-5-sulfonic acid, 1,3-dibromoisothianaphthene-5-sulfonic acid, 1,1,3,3-tetrachloroisothianaphthene-5-sulfonic acid, 1,3-dihydro-6-methoxyisothianaphthene-5-sulfonic acid, 1,3-dichloro-6-methoxyisothianaphthene-5-sulfonic acid, 1,3-dihydro-6-butoxyisothianaphthene-5-sulfonic acid, 1,3-dihydro-6-decyloxyisothianaphthene-5-sulfonic acid, 1,3-dihydro-6-methoxycarbonylisothianaphthene-5-sulfonic acid, 1,3-dihydro-4,7-dimethoxyisothianaphthene-5-sulfonic acid, 1,3-dihydroisothianaphthene-5,6-disulfonic acid, 1,3-dibromo-4,7-dimethoxyisothianaphthene-5-sulfonic acid, 1,3-dihydro-5,6-dioxymethyleneisothianaphthene-4-sulfonic acid, 1,3-dihydro-6-nitroisothianaphthene-5-sulfonic acid, 1,3-dihydro-6-bromoisothianaphthene-5-sulfonic acid, 1,3-dihydro-6-cyanoisothianaphthene-5-sulfonic acid, 1,3-dihydro-6-aminoisothianaphthene-5-sulfonic acid, 1,3-dihydro-6-trifluoromethylisothianaphthene-5-sulfonic acid, and a lithium salt, a sodium salt, a potassium salt, an ammonium salt, and a quaternary ammonium salt of these sulfonic acid derivatives, but the present invention should not be construed as being limited thereto.

More specific examples of the compounds represented by formula (XI) include 1,3-dihydronaphtho[2,3-c]thiophene-5-sulfonic acid, 1,3-dichloronaphtho[2,3-c]thiophene-5-sulfonic acid, 1,3-dibromonaphtho[2,3-c]thiophene-5-sulfonic acid, 1,3-dihydronaphtho[2,3-c]thiophene-6-sulfonic acid, 1,1,3,3-tetrachloronaphtho[2,3-c]thiophene-5-sulfonic acid, 1,3-dihydro-7-methoxynaphtho[2,3-c]thiophene-6-sulfonic acid, 1,3-dihydro-5,7-dimethoxynaphtho[2,3-c]thiophene-6-sulfonic acid, 1,3-dibromo-5,7-dimethoxynaphtho[2,3-c]thiophene-6-sulfonic acid, 1,3-dihydro-6,7-dioxymethylenenaphtho[2,3-c]thiophene 5-sulfonic acid, 1,3-dihydro-8-methoxycarbonylnaphtho[2,3-c]thiophene-6-sulfonic acid, 1,3-dihydro-7-nitronaphtho[2,3-c]thiophene-5-sulfonic acid, 7-bromo-1,3-dihydronaphtho[2,3-c]thiophene-5-sulfonic acid, 7-cyano-1,3-dihydronaphtho[2,3-c]thiophene-5-sulfonic acid, 1,3-dihydro-7-methylnaphtho[2,3-c]thiophene-6-sulfonic acid, 1,3-dihydro-6,7-dimethylnaphtho[2,3-c]thiophene-5-sulfonic acid, 1,3-dihydro-7-trifluoromethylnaphtho[2,3-c]thiophene-5-sulfonic acid, and a lithium salt, a sodium salt, a potassium salt, an ammonium salt, and a quaternary ammonium salt of these sulfonic acid derivatives, but the present invention should not be construed as being limited thereto.

In the compound represented by formula (VI), (X) or (XI), the electroconductive polymer comprising at least one structural unit represented by formula (VII), and the electroconductive polymer comprising a structure represented by formula (VIII) or (IX), the counter cation of the sulfonic acid ion is $H^+$, an alkali metal ion, such as $Na^+$, $Li^+$ and $K^+$, or a cation of a Vb Group element unsubstituted or substituted with an alkyl group having from 1 to 30 carbon atoms, preferably from 1 to 20 carbon atoms, more preferably from 1 to 12 carbon atoms, or with an aryl group having from 6 to 30 carbon atoms, preferably from 6 to 20 carbon atoms, more preferably from 6 to 16 carbon atoms, such as $NH_4^+$, $NH(CH_3)_3^+$, $N(CH_3)_4^+$, $NH(C_2H_5)_3^+$, $N(C_6H_5)_4^+$, $PH_4^+$, $P(CH_3)_4^+$, $P(C_6H_5)_4^+$, $AsH_4^+$, $As(CH_3)_4^+$ and $As(C_6H_5)_4^+$. In these formulae, $M^1$ may be a plurality of different cations selected from the above-described cations. The conversion into a specific cation may be conducted by ion exchange into a desired cation by using a conventional ion-exchange resin or a dialysis membrane.

$X^1$, $X^2$, $X^3$ and $X^4$ in formulae (VI), (X) and (XI) each independently represents a hydrogen atom or a halogen atom. The halogen is preferably chlorine, bromine or iodine, and more preferably chlorine or bromine.

When the cation represented by $M^1$ is $H^+$, the electroconductive polymer having a main chain of a π-electron conjugated structure and comprising a chemical structure represented by formula (.VII), (VIII) or (IX) exhibits a self-doping state in an aqueous solution without the help of an external dopant, and in particular, may exhibit a gel state at a high concentration. Further, by changing the cation represented by $M^1$, the solubility in various solvents, or the affinity to the solvent, can be varied.

The electroconductive copolymer comprising a chemical structure represented by formula (VIII) according to this embodiment of the present invention is a copolymer comprising at least one structural unit represented by formula (VII) as a repeating unit and another repeating unit of a π-electron conjugated structure in the main chain structure of the polymer. Examples of the repeating unit of the π-electron conjugated structure include vinylene, an aromatic structure and a heterocyclic structure. Examples of the aromatic structure and the heterocyclic structure include isothianaphthenylene, isobenzofurylene, isobenzoindolylene, isobenzoselenylene, isobenzotellurylene, thienylene, pyrrolylene, furylene, selenylene, tellurylene, iminophenylene and phenylene structures. A plurality of these skeleton structures may be present. Further, the repeating unit of the above-described π-electron conjugated structure may be substituted with a substituent which does not inhibit the polymerization. Suitable substituents include any of those described above for $R^4$, $R^5$, $R^6$, $R^7$ and $R^8$.

In the electroconductive copolymer comprising a chemical structure represented by formula (VIII), p and q represent the molar fractions of the respective repeating units in the copolymer as described above. Accordingly, p and q of formula (VIII) do not denote a block copolymer. With respect to the molar fractions of the above-described copolymer (p:q, with the proviso that p+q=1), p as the molar fraction of the repeating unit composed of the structural unit represented by formula (VII) is preferably from 0.05 to 0.95, more preferably from 0.2 to 0.9 and most preferably from 0.4 to 0.9. The larger the p value, the greater the water solubility.

The molecular weight of the water-soluble electroconductive polymer of the present invention of the formula (I), (II) and (III), is in the range between 1,000 and 500,000, preferably between 10,000 and 100,000.

Moreover, the polymer comprising at least one structural unit represented by formula (VII) as a repeating unit and the copolymer comprising a chemical structure represented by formula (VIII) or (IX) have a molecular weight of from 1,000 to 500,000, preferably from 10,000 to 100,000.

A process for producing an electroconductive polymer comprising a chemical structure represented by formula (VII) or an electroconductive copolymer comprising a chemical structure represented by formula (VIII) or (IX) comprises the homopolymerization or copolymerization of the compound having a chemical structure represented by formula (VI), (X) or (XI), or the above-described compound and another aromatic compound, and/or heterocyclic compound, and/or compound capable of forming π-electron conjugated structure.

The compound having a chemical structure represented by formula (VI), (X) or (XI) can be polymerized alone or in the presence of another aromatic and/or heterocyclic compounds of a π-electron conjugated structure and/or a compound capable of forming a π-electron conjugated structure, under an elevated temperature or at room temperature or at a low temperature or while raising the temperature, favored by the action of the oxidizing agent employed. Accordingly, the polymer comprising a chemical structure represented by formula (VII) or the copolymer comprising a chemical structure represented by formula (VIII) or (IX) can be produced very efficiently.

In particular, when the compound having a chemical structure represented by formula (VI), (X) or (XI) is subjected to the polymerization reaction at a high temperature where a sulfonic acid group is readily released, a copolymer comprising a chemical structure represented by formula (VIII) or (IX) is obtained.

Examples of the oxidizing agent which brings about an oxidative dehydrogenation reaction in the polymerization generally include a sulfonating reagent, such as sulfuric acid, fuming sulfuric acid, sulfur trioxide, chlorosulfuric acid, fluorosulfuric acid and amidosulfuric acid, and an oxygen-oxidizing agent using ozone, a peroxide, a peracid, a quinone, such as 2,3-dichloro-5,6-dicyano-1,4- benzoquinone, tetrachloro-1,2-benzoquinone, tetrachloro-1,4-benzo quinone, and tetracyano-1,4-benzoquinone, halogen, such as iodine and bromine, anhydrous aluminum chloride/copper(I) chloride, anhydrous iron(III) chloride, a vanadium-, manganese- or nickel-based metal complex, and a combination of these oxidizing agents. However, there is no particular restriction on the oxidizing agent.

The addition amount of the oxidizing agent varies depending upon the compound having a chemical structure represented by formula (VI), (X) or (XI), and the kind of the oxidizing agent used, and cannot be absolutely determined. However, in general, the oxidizing agent is preferably used in an amount of from 1.1- to 20-fold equivalent, more preferably from 2- to 5-fold equivalent, of the compound.

The concentration of the compound having a chemical structure represented by formula (VI), (X) or (XI) used in the process of the present invention varies depending upon the kind of the compound, the reaction scale, and the kind of chemical compound, such as solvent and/or the absence or presence thereof. However, in general, the concentration of the compound is preferably from $10^{-3}$ to 10 mol/liter, more preferably from $10^{-2}$ to 1 mol/liter.

The reaction temperature is determined according to the reaction method employed, and cannot be specifically restricted. However, in general, the reaction temperature is preferably from $-70°$ C. to $250°$ C., more preferably from $0°$ C. to $150°$ C. Further, although the chemical structure never imposes any restriction on the reaction temperature, it is preferably $70°$ C. or higher when a copolymer comprising a chemical structure represented by formula (VIII) or (IX) is produced using only a compound having a chemical structure represented by formula (VI), (X) or (XI).

The reaction time varies depending upon the reaction method, the reaction temperature, the reaction pressure, or the chemical structure of the compound and cannot be absolutely defined. However, in general, it is preferably from 0.01 hour to 240 hours, more preferably from 0.1 hour to 24 hours. The reaction pressure is preferably a normal pressure, but may be from $10^{-5}$ to 100 atm, and more preferably from 1 to 10 atm.

The substitution ratio of the sulfonic acid group of the repeating units in the polymer can be decreased by raising the temperature during the reaction up to 60 to $150°$ C., for 10 min to 20 hours, preferably up to $80°$ to $120°$ C., for 30 min to 10 hours.

The reaction solvent, which is used if desired, varies depending upon the reaction temperature, the reaction time, the oxidizing agent and the chemical structure of the compound used, and cannot be absolutely determined. However, any solvent may be used as long as the solvent dissolves the compound or the oxidizing agent, and does not inhibit the polymerization reaction. Specific examples of the solvent include water, sulfuric acid, fuming sulfuric acid, formic acid, acetic acid, propionic acid, acetic anhydride, an ether, such as tetrahydrofuran, dioxane and diethyl ether, a polar solvent, such as dimethylformamide, acetonitrile, benzonitrile, N-methylpyrrolidone (NMP) and dimethylsulfoxide (DMSO), an ester, such as ethyl acetate and butyl acetate, and a non-aromatic chlorine-based solvent, such as chloroform and methylene chloride. A mixed solvent of these solvents may also be used.

The thus produced polymer comprising at least one structural unit represented by formula (VII) as a repeating unit or copolymer comprising a chemical structure represented by formula (VIII) or (IX) exhibits high solubility in the solvent, and also has a water solubility due to the sulfonic acid group. Because of these characteristics, the polymer or copolymer can be isolated and purified through ultrafiltration, dialysis and/or ion-exchange operations. In the case when the polymer comprising a chemical structure represented by formula (VII) or the copolymer comprising the chemical structure represented by formula (VIII) or (IX) is obtained as a precipitant from the reaction solvent, the polymer or the copolymer can be isolated and purified through filtration, reprecipitation and/or solvent fractionation.

The copolymer comprising the chemical structure represented by formula (VIII) or (IX) is produced by polymerizing the compound represented by formula (VI), (X) or (XI) in the presence or with the sequential addition of another aromatic and/or heterocyclic compound of a $\pi$-electron conjugated structure, and/or a compound capable of forming a $\pi$-conjugated structure after the reaction.

Examples of the aromatic compound and the heterocyclic compound used herein include isothianaphthene, isobenzofuran, isobenzoindoline, isobenzoselenaphene, isobenzoterenaphene, thiophene, pyrrole, furan, selenophene, tellurophene, aniline, benzene, naphtho[2,3-c]thiophene, anthra[2,3-c]thiophene, naphthaceno[2,3-c]thiophene, pentaceno[2,3-c]thiophene, perylo[2,3-c]thiophene, acenaphtho[2,3-c]thiophene and their derivatives having various substituents. Suitable substituents include any of those described above for $R^4$, $R^5$, $R^6$, $R^7$ and $R^8$.

Examples of the compound capable of forming a conjugated structure after the reaction include a 1,3-dihydro form, a 1,3-dihalogeno form, a 1,1,3,3-tetrahalogeno form and a 2-oxide form of the above-described isothianaphthene, 5-alkoxyisothianaphthene, 5,6-dialkoxyisothianaphthene, naphtho[2,3-c]thiophene, anthra[2,3-c]thiophene, naphthaceno[2,3-c]thiophene, pentaceno[2,3-c]thiophene, perylo[2,3-c]thiophene, and acenaphtho[2,3-c]thiophene.

A compound containing nitrogen in the condensed ring may also be used, and examples thereof include 1,3-dihydrothieno[c]pyridine, 1,3-dihydrothieno[c]pyrazine, 1,3-dihydrothieno[c]pyridazine and 1,3-dihydrothieno[c]quinoxaline. Of these, preferred are compounds which form a thiophene, isothianaphthene, pyrrole, aniline or naphtho[c]thiophene structure.

In the process for producing the copolymer according to the present invention, the content of the sulfonic acid group in the polymer comprising a chemical structure represented by formula (VIII) or (IX) can be easily controlled by changing the charging ratio of the compound represented by formula (VI), (X) or (XI), and the aromatic compound, the heterocyclic compound or the compound capable of forming a conjugated structure. Further, the properties of the polymer comprising a chemical structure represented by formula (VIII) or (IX) can be easily controlled by changing the kind or ratio of the aromatic compound, the heterocyclic compound or the compound capable of forming a conjugated structure to be copolymerized therewith.

The water- and/or organic solvent-soluble electroconductive polymer obtained by polymerizing the compound having the chemical structure represented by formula (VI), (X) or (X I) according to the present invention shows a small energy gap as a semiconductor, and a high conductivity at a low doping level as compared with known electroconductive polymers, for example, a polythiophene derivative (disclosed in JP-A-2-242816), and has been found to be very stable in its electroconductive state. Further, due to the effect of the sulfonic acid group as a substituent, a self-doping state readily arises.

In the present invention, an electroconductive polymer comprising a chemical structure represented by formula (VII) or (VIII) can be very efficiently produced by reacting an oxidizing agent with the condensed heteropolycyclic compound having a sulfonic acid group represented by formula (VI). The condensed heteropolycyclic compound of a π-electron conjugated system, such as isothianaphthene and naphtho[c]thiophene, is very highly reactive and hard to deal with during production. However, the sulfonic acid group-containing 1,3-dihydroheteropolycyclic compound represented by formula (VI) is very stable and can-be easily handled in respective unit operations for producing the compound. In other words, the present invention makes it feasible to produce a sulfonic acid group-containing electroconductive polymer or copolymer by the polymerization of a sulfonic acid group-substituted condensed heteropolycyclic compound having a 1,3-dihydro structure as a monomer.

Among those polymers having a chemical structure represented by any of the formula (I), (II) and (III), a polyisothianaphthene derivative (i.e., S for X in the formula (I), (II) or (III) has such a small energy gap as about 1.0 eV as a semiconductor, which is smaller than that of a known water-soluble electroconductive polymer such as a polythiophene derivative having a sulfoalkyl group as a substituent, and is characterized by exhibiting high conductivity at a low doping level and having high stability in its conductivity. Therefore, the present polymer has sufficiently weak absorbance in the visible ray region, particularly in a doped state, so that it can serve as a transparent conducting material having high stability in its conductivity.

The process for producing a polymer according to the present invention provides a practical and novel bicyclic water-soluble electroconductive polymer by reacting a sulfonating agent with a compound represented by the formula (IV) or formula (V). This process using the sulfonating agent provides the novel bicyclic water-soluble electroconductive polymer from a relevant monomer by simultaneously effecting the polymerization reaction and the sulfonating reaction in one step. Thus, it constitutes itself a novel method of production. Namely, the process of the present invention for producing compounds represented by the formulas (I), (II) and (III) is a particularly effective means for producing the bicyclic water-soluble electroconductive polymer from said monomer compound by said reactions effected in one step. This advantage is well appreciated because such a bicyclic electroconductive polymer as polyisothianaphthene is infusible and insoluble in organic solvents or in Brönsted acid such as mineral acids and accordingly, the sulfonation does not proceed like polyaniline which is soluble in organic solvents.

The water-soluble electroconductive polymer having a chemical structure represented by the formula (I) produces an amphoteric water-soluble electroconductive polymer having a chemical structure represented by the formula (II) and/or (III) by electrochemical or chemical oxidation.

Conversely, the polymer having a chemical structure represented by the formula (II) and/or (III) converts itself into a polymer having a chemical structure represented by the formula (I) by electrochemical or chemical reduction. Thus, the polymer having a chemical structure represented by the formula (I) and the polymer having a chemical structure represented by the formula (II) and/or (III) can be reversibly doped and de-doped by an oxidation/reduction reaction.

The doping mentioned above can be effected by any of the known electrochemical and chemical methods. For example, electrochemical doping method which comprises nipping a water-soluble electroconductive polymer film between opposed electrodes, placing the nipped film in a solution containing a dopant, and applying a potential to the electrodes may be adopted. For chemical doping, the gaseous phase method which comprises causing a dopant such as iodine in the gaseous phase to react on a water-soluble electroconductive polymer film may be used (See "Fundamental Principles and Applications of Conducting Polymers—Synthesis, Physical Properties, Evaluation, and Applied Technologies", page 245–259, I.P.C.).

The dopants which are effectively usable in the reaction under discussion (represented by the symbol Z in the formula (III)) include halogenide anions of Vb group elements such as $PF_6^-$, $AsF_6^-$ and $SbF^{6-}$, halogenide anions of IIIb group elements such as $BF_4^-$, halogen anions such as $I^-$ ($I_3^-$), $Br^-$ and $Cl^-$, perhalogenate anions such as $ClO_4^-$, Lewis acid, protonic acid, electrolytic anions and polyelectrolytic anions, for example. The dopant does not need to be limited to these examples. Optionally, two or more such dopants may be used in combination.

Now, the process to be employed in producing the water-soluble electroconductive polymer of the present invention of the formula (I), (II) and/or (III) will be described below.

The polymer having a chemical structure represented by the formula (I), (II) and/or (III) can be produced by reacting a sulfonating agent such as fuming sulfuric acid with the compound having the formula (IV) or (V).

Specifically, the reaction of cationic polymerization and the reaction of sulfonation occur in one and the same reaction solution on the compound represented by the formula (IV) or (V) to produce the polymer having a chemical structure represented by the formula (II) or (III). The produced polymer can be easily converted by neutralization into the polymer having a chemical structure represented by the formula (I). The polymer having structure (II) or (III), therefore, may be utilized in its unmodified form. Since the control of the doping level in the compound (II) or (III) is easy to effect, it will be more convenient to produce the polymer having structure (I) by thoroughly effecting the neutralization mentioned above and, whenever necessary, produce the polymer having structure (II) or (III) from the polymer having structure (I) as mentioned above.

Of the compounds represented by the general formula (IV), those compounds having H for both $R^1$ and $R^2$ and S for Y can be easily produced by such known methods as disclosed by J. A. Gladysz et al. in *Tetrahedron*, 35, 2329 (1979), for example.

Of the compounds having the formula (V), those compounds having H for both $R^1$ and $R^2$ and S for X can be easily produced from the compounds having the formula (IV) by such known methods as disclosed by R. Meyer et al. in *J. Prakt. Chem.*, 20, 244 (1963), for example.

The sulfonating agents which are effectively usable herein include, for example, sulfuric acid, fuming sulfuric acid, sulfur trioxide, chlorosulfonic acid, fluorosulfonic acid, and sulfamic acid. Although the amount of the sulfonating agent to be used herein is not specifically limited, because it is variable depending the kind of monomer and the kind of sulfonating agent, the preferable amount is in the range between 1.1 to 20 equivalents to the molar amount of the monomer. Optionally, two or more such sulfonating agents may be used in combination.

The concentration of the monomer usable in the production of the polymer having a chemical structure represented by the formula (I), (II), and/or (III) is generally desired to be in the range between $10^{-4}$ and 10 mol/liter, although it is variable depending upon the kind of monomer and the scale of reaction.

The reaction temperature usable in the production of the polymer having a chemical structure represented by the formula (I), (II), and/or (III) is not particularly limited but fixed, depending on the particular method of reaction to be used. Generally, the reaction temperature is preferably in the range between −80° C. and 250° C., more preferably between −30° C. and 150° C. The polymerization time is preferably in the range between 0.01 hour and 200 hours, although it is variable de ending upon the method of polymerization, the temperature of polymerization or the monomer and cannot be generally defined.

The solvent usable in the polymerization reaction for the production of the polymer having a chemical structure represented by the formula (I), (II), and/or (III) from the compound having the formula (IV) or (V) cannot be generally defined because it is variable, similarly to the polymerization temperature and the polymerization time, depending upon the sulfonating agent and the monomer to be used in the polymerization reaction. The solvent is only required to be capable of dissolving the monomer and the sulfonating agent and to be one inhibiting neither the reaction of sulfonation nor the polymerization reaction. More specifically, the solvents which are effectively usable herein include, for example, water, sulfuric acid, fuming sulfuric acid, formic acid, acetic acid, propionic acid, acetic anhydride, ethers such as tetrahydrofuran, dioxane and diethyl ether, polar solvents such as dimethyl formamide, acetonitrile and benzonitrile, esters such as ethyl acetate and butyl acetate, and non-aromatic chlorine type solvents such as chloroform and methylene chloride. Optionally, these solvents may be used in the form of any mixture thereof.

Further, in order to prevent the formation of sulfone compound as a by-product which is known to be formed during the reaction of sulfonation, any known inhibitory compound may be added upon and during the sulfonation and polymerization reactions. Although the inhibitory compound to be used herein and its amount are variable depending upon the sulfonating agent and monomer, specific examples of such compounds include fatty acids, organic peroxides, fatty acid anhydrides, pyridine, acetic acid, ketones and the like, effectively usable in the range between 0.01 and 5 mole %.

The polymer having a chemical structure of the formula (I), (II), or (III) is soluble in water and may include one which is also soluble in organic solvents. In the case of the polymer which is prepared in the form of an aqueous solution, it can be separated and purified by ultrafiltration, dialysis, and/or ion exchange operation. In the case of the polymer which is prepared in the form of precipitate from the solvent used in the reaction, it can be separated and purified by filtration, reprecipitation, and/or solvent fractionation.

The polymer according to the present invention may be a copolymer with another monomer which is capable of imparting to the copolymer a main-chain structure possessing a π-electron conjugate system, or a copolymer which contains, for example, isothianaphthenylene, isobenzofurylene, isobenzoindolylene, isobenzoselenylene, isobenzoterullylene, thienylene, pyrrolylene, furylene, selenylene, terullylene, iminophenylene, phenylene, vinylene and/or ethynylene structures in the polymer main chain. It should be noted that the copolymers are not limited to these examples. The copolymer can be produced by allowing such a heterocyclic monomer as one which generates the main-chain structure as mentioned above to coexist in the reaction mixture of polymerization reaction described herein.

When such a heterocyclic monomer as one which produces the main-chain structure as mentioned above is copolymerized by the method described above with the compound having the formula (IV) or (V), the product of this copolymerization is a polymer containing one structure having the formula (I), (II), and/or (III) or a polymer containing two or more such structures.

The polymers, including copolymers, having the chemical structure represented by the formula (I), (II) and/or (III) and obtained by the above-mentioned production method generally exhibit high degrees of solubility in water. When the symbol M in the general formula is hydrogen, some of the polymers produced assume the form of gel in a high concentration. The solubility in a solvent and the affinity to the solvent of the polymers may be varied depending upon the symbol M.

From the polymers having the chemical structure represented by the formula (I), (II), or (III) or copolymers thereof, owing to their solubility in water, films, linear shaped articles such as fibers, or bulky shaped articles such as rods, plates, sheets and other solid articles can be easily manufactured by the molding or film making methods which are known in the plastic industry.

The concentration of the solution to be used in said molding or film making methods is preferably in the range between 0.5% and 60% by weight, although it is variable depending upon the condition of molding, the chemical structure of polymer, or the kind of solvent. The molding or film making process is preferably carried out in an atmosphere of inert gas or under vacuum. A film of the polymer can be produced by preparing a solution of the polymer in an appropriate solvent and casting the polymer in an appropriate solvent and casting the polymer solution on a proper medium such as, for example, a glass plate or sodium bromide disc. Fibers or a bulky shaped article of the polymer is produced by directly shaping the polymer solution in a desired shape. The polymer, when necessary, may be stretched to a desired shape.

Furthermore, according to the present invention, the water-soluble conducting polymer can be processed to similar articles as above which comprise such a water-soluble conducting polymer and another polymer such as polyvinylalcohol in an optional ratio, for example, by dissolving or mixing the former and the latter in an appropriate solvent and processing the polymers contained in the resulting solution (or the mixture) into a desired shaped article by a similar method as above. In such a case, the amount of said another polymer may preferably be used in the range between 10 and 500% by weight of the water-soluble conducting polymer. The solvent used herein is preferably water, but is not limited to water and may be selected from any other solvents or may be a mixed solvent, provided that the polymer has sufficient solubility in such a selected solvent for processing a shaped article.

The shaped articles manufactured by the above-mentioned processes have quite stable conductivity during the long period of time.

The present invention is based on the principle that the novel water-soluble electroconductive polymer having a chemical structure represented by the formula (I) can be obtained by reacting a sulfonating agent with the bicyclic heterocyclic monomer compound having the formula (IV) or (V). The polymer is obtained, for the first time, solely by the particular reaction in which the reaction of sulfonation and the polymerization reaction are simultaneously effected by directly reacting the sulfonating agent on the monomer compound.

The polymer having the chemical structure represented by the formula (I) converts itself into the water-soluble electroconductive polymer having the chemical structure represented by the formula (II) or (III) by doping, thereby the conductivity of the polymer is remarkably increased. This novel polymer can be reverted to the original polymer having the chemical structure represented by the formula (I) by either remarkably increasing electroconductivity or de-doping.

EXAMPLES

The present invention will now be further illustrated by, but is by no means limited to, the following Examples.

Example 1

Process for production of the polymer having a chemical structure represented by the formula (I), having H for both $R^1$ and $R^2$, S for X, and $Na^+$ for M.

To 2.0 g of fuming sulfuric acid (20% $SO_3$) kept at 10° C., 550 mg (4.0 mmol) of 1,3-dihydroisothianaphthene, a known compound, was slowly added as stirred. When the resultant mixture was allowed to cool to a room temperature and was continued to stir for one hour, the reaction solution became a reddish purple color. The reaction solution, when heated to 70° C., was changed to a dark blue color. After 30 minutes, it was turned into a solid substance. The resultant reaction mixture was placed in 100 ml of 0.1N NaOH/methanol to be neutralized and precipitated therein. The precipitate was separated with a centrifugal separator. The solid reaction product was dissolved in 100 ml of water and the resultant aqueous solution was treated with a dialysis membrane to remove sodium sulfate as foreign matter. The dialyzed solution was allowed to evaporate under a reduced pressure to remove the solvent therefrom and then dried under vacuum, to obtain 430 mg of a black Na form polymer (yield 45%).

Figure 2:
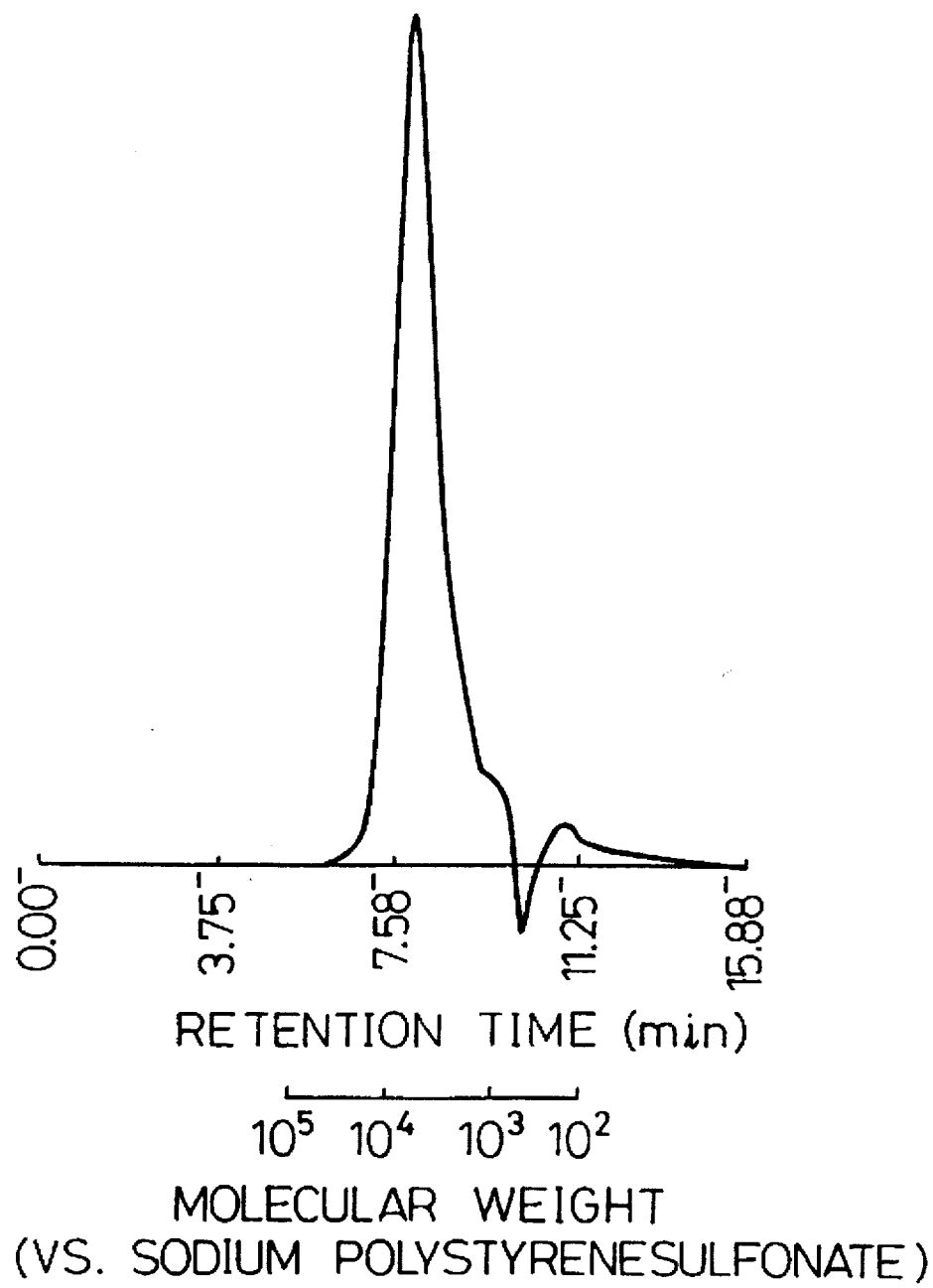
FIG. 2 is a gel permeation chromatograph of the polymer obtained in Example 1.
Figure 3:
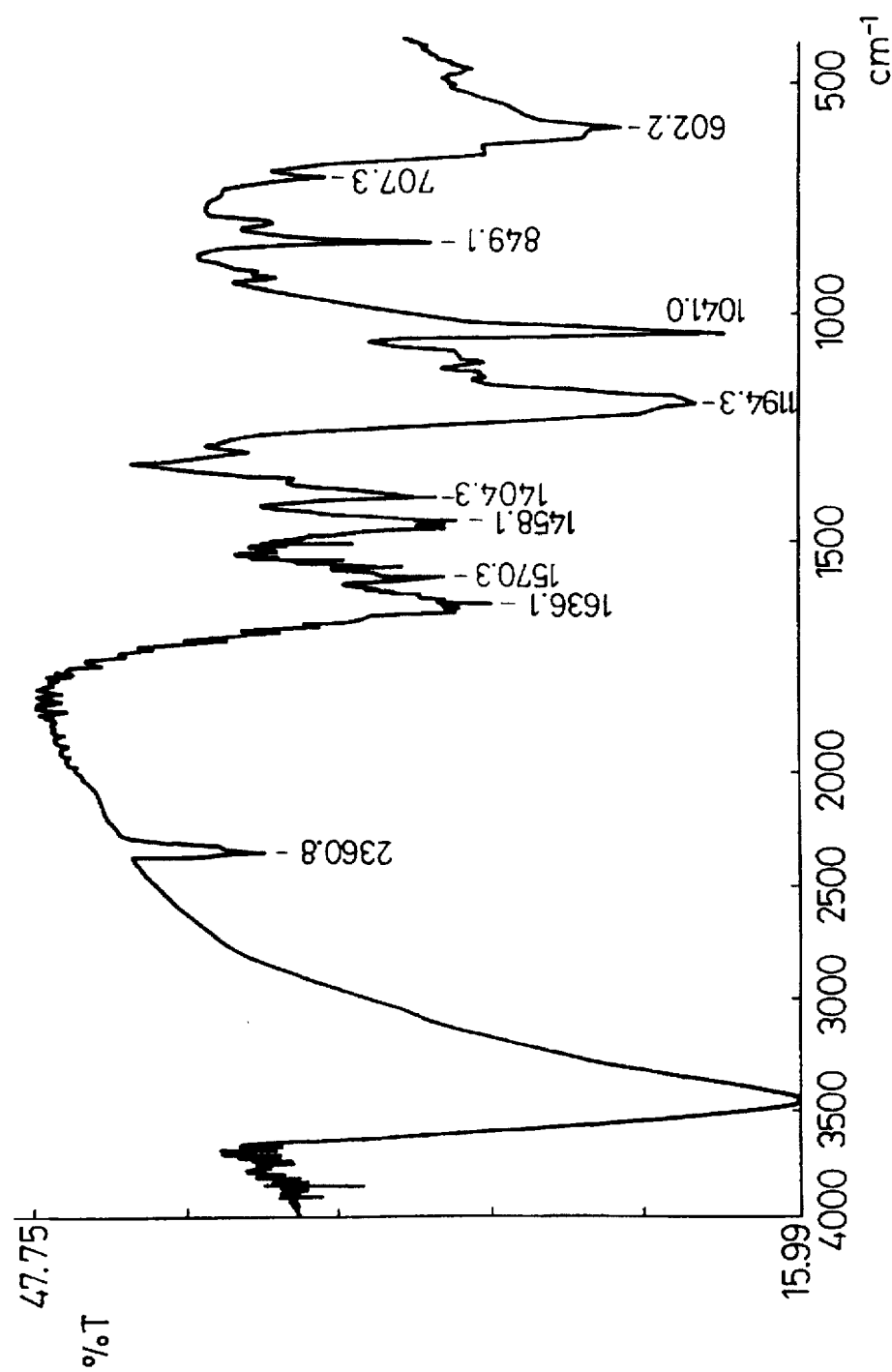
FIG. 3 is an infrared absorption spectrum of the polymer obtained in Example 1.
Figure 4:
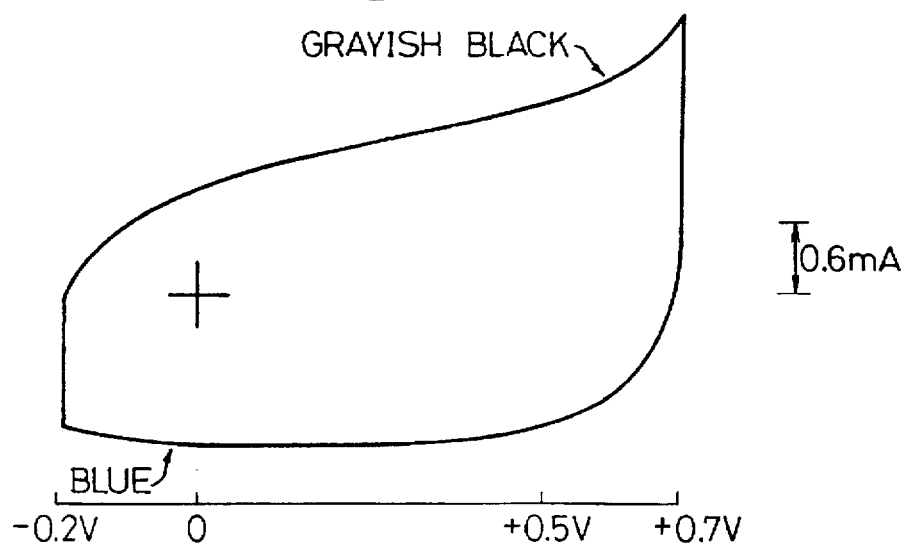
FIG. 4 shows a cyclic voltammogram performed on the film of the polymer obtained in Example 1.

The polymer thus produced yielded a UV spectrum illustrated in FIG. 1. The molecular weight distribution of the polymer measured by GPC is illustrated in FIG. 2. The IR spectrum of the polymer is illustrated in FIG. 3. FIG. 4 shows the cyclic voltammogram performed on a polymer film (polymer film/ITO glass operating electrode, platinum counter electrode, silver/silver ion reference electrode in acetonitrile, borofluoric acid-acetonitrile electrolyte, scanning speed 50 mV/sec.). The graph indicates that the polymer, in a cycle between −0.2 V and 0.7 V under fixed conditions, can be electrochemically doped and dedoped.

Elementary analyses (%) for $C_8H_3S_2O_3Na$ Calculated: C; 41.02%, H; 1.298, S; 27.38%, Na; 9.82% Found: C; 40.57%, H; 1.51%, S; 27.55%, Na; 9.38%

Example 2

Process for production of the polymer having a chemical structure represented by the formula (I) having H for both $R^1$ and $R^2$, S for X, and $H^+$ for M.

An aqueous solution was prepared by dissolving 380 mg of a reaction mixture obtained in the same manner as in Example 1 in about 1,000 ml of water and adjusting a pH of the solution to 1.9 with hydrochloric acid. The aqueous solution was purified and concentrated by ultrafiltration. The concentrate was allowed to evaporate under a reduced pressure to remove water and dried under vacuum, to obtain 320 mg of a black polymer.

Figure 5:
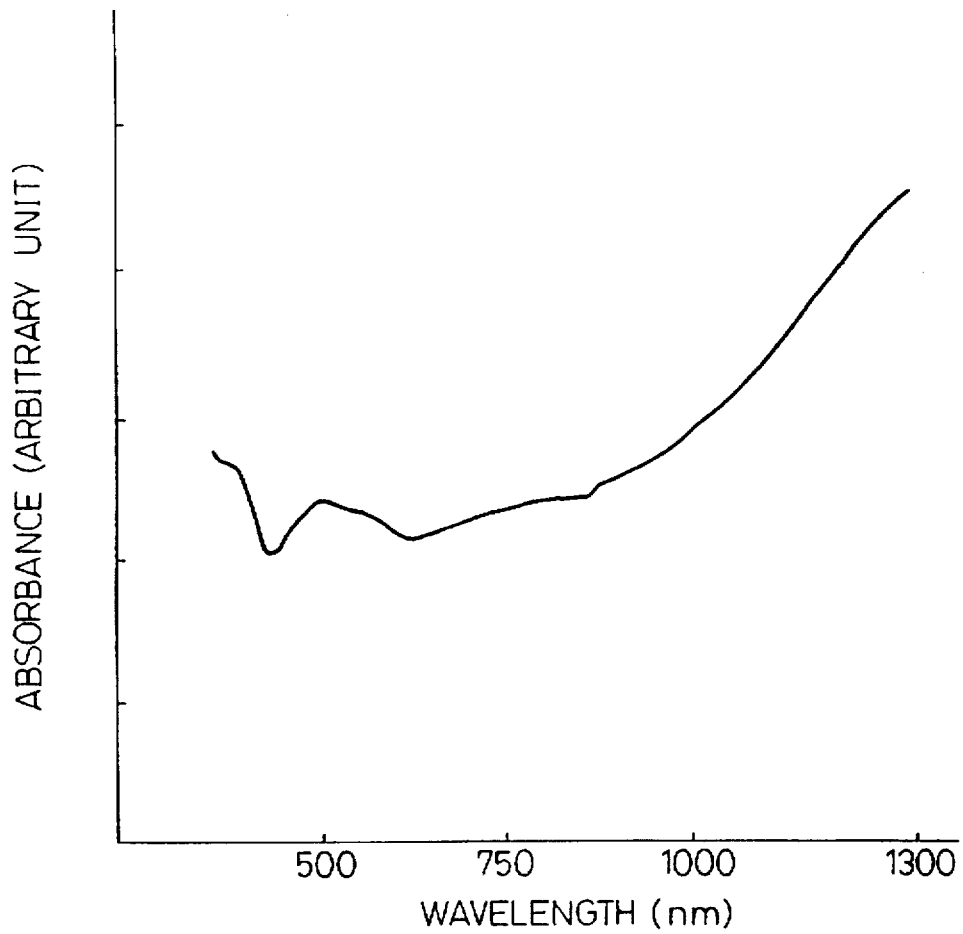
FIG. 5 is a UV spectrum of the polymer obtained in Example 2.

The UV spectrum of the polymer produced above is illustrated in FIG. 5. When the polymer was then adjusted to a pH value of about 8 by addition of aqueous NaOH, the UV spectrum of the polymer in the solution was changed to that which is illustrated in FIG. 1.

Example 3

Process for production of the polymer having a chemical structure represented by the formula (I) having H for both $R^1$ and $R^2$, S for X, and $H^+$ for M.

An aqueous solution of acid form polymer was obtained by dissolving 200 mg of a polymer prepared in the same manner as in Example 1 in 50 ml of water and subjecting the resultant solution to an ion-exchange treatment using an H form cation-exchange resin (Amberlite IR-120B). When this aqueous solution was allowed to evaporate under a reduced pressure to remove water and dried under vacuum, 180 mg of a black polymer was obtained. The spectrum of the produced polymer was similar to that shown in FIG. 5.

Example 4

Process for production of the polymer having a chemical structure represented by the formula (I) having H for both $R^1$ and $R^2$, S for X, and $H^+$ for M.

In 4.0 ml of sulfuric acid containing 2.0 ml of fuming sulfuric acid (20% $SO_3$), 500 mg of 1,3-dihydroisothianaphthene was slowly added as stirred at a room temperature and then continuously stirred overnight. The resultant reaction solution exhibited a red color. When it was then heated to 90° C., it changed a dark blue color at once. After three hours, it was turned into a dark blue homogeneous solution.

Further, the reaction mixture was heated and stirred at the same temperature for two hours and then poured into 1,000 ml of water. The resultant aqueous solution was adjusted to pH 1.9, purified with an ultrafilter membrane and concentrated to 100 ml. The concentrate was allowed to evaporate under a reduced pressure to remove water and dried under vacuum, to obtain 390 mg of a black polymer.

The UV spectrum and the IR spectrum of the polymer produced above were similar to those obtained in Example 2.

Elementary analysis (%) for $C_8H_4O_{1.65}S_{1.55}$ Calculated: C; 54.54%, H; 2.27%, S; 28.18% Found: C; 55.33%, H; 2.98%, S; 27.45%

Example 5

Process for production of the polymer having a chemical structure represented by the formula (I) having H for both $R^1$ and $R^2$, S for X, and $Na^+$ for M.

To 2.0 g of fuming sulfuric acid (20% $SO_3$) kept at 10° C., 500 mg (4.0 mmol) of 1,3-dihydroisothianaphthene-2-sulfoxide, a known compound, was slowly added as stirred. The resultant mixture was allowed to cool to room temperature and stirred continuously for one hour. The reaction solution exhibited a reddish purple color. When the reaction solution was then heated to 80° C., it changed to a dark blue color. After 30 minutes, it was turned into a solid substance. The resultant reaction mixture was placed in 100 ml of 0.1N NaOH/methanol. The precipitate was dissolved in 100 ml of water, dialyzed to expel excess sodium sulfate, then the dialyzed solution was allowed to evaporate under a reduced pressure to remove the solvent, and dried under a vacuum to obtain 430 m g of a black polymer.

The UV spectrum and the IR spectrum of the produced polymer were similar to those obtained in Example 1.

Elemental analyses (%) for $C_8H_{2.88}O_{3.36}S_{1.12}Na_{1.12}$ Calculated: C; 44.81%, H; 1.34%, S; 16.73%, Na; 12.02% Found: C; 44.21%, H; 1.13%, S; 16.53%, Na; 12.84%

Example 6

Process for production of the polymer having a chemical structure represented by the formula (I) having H for both $R^1$ and $R^2$, S for X, and $Na^+$ for M.

To 8 ml of sulfuric acid containing 2.0 g of fuming sulfuric acid (20% $SO_3$) kept at 0° C. in an atmosphere of nitrogen, 400 mg of isothianaphthene, a known compound, was slowly added as stirred. When the resultant mixture was stirred continuously for eight hours, the resultant reaction solution exhibited a red color. When the reaction solution was then allowed to cool to room temperature and subsequently heated to 90° C., it exhibited a dark blue color. After five hours, it turned into a homogeneous black solution.

The reaction mixture was poured into 100 ml of 0.1N NaOH/methanol. The precipitate was centrifugally separated. The solid centrifugate was dissolved in 100 ml of water, dialyzed to remove excess sodium sulfate, then the dialyzed solution was allowed to evaporate under a reduced pressure to remove water, and dried under a vacuum to obtain 220 mg of a black polymer.

The UV spectrum and the IR spectrum of the produced polymer were similar to those obtained in Example 1.

Example 7

Conversion of the polymer having a chemical structure represented by the formula (I) to the polymer having a chemical structure represented by the formula (II) and/or formula (III).

A polymer film was manufactured by dissolving 50 mg of a polymer prepared in the same manner as in Example 1 in 2 ml of water and casting the resultant aqueous solution on an ITO glass plate by spin-casting method. An electrochemical cell was constructed by using the film-coated ITO glass plate as a working electrode, a platinum wire as a counter electrode, and a silver/silver ion electrode as a reference electrode. When a potential of 0.5V was applied electrochemically to the cell at a room temperature in a 0.5 mol/liter $HBF_4$/acetonitrile solution (having a water content of 6%), the film which was in a blue color turned to a grayish black color.

Example 8

Conversion of the polymer having a chemical structure represented by the formula (I) to the polymer having a chemical structure represented by the formula (II) and/or formula (III).

A polymer film was manufactured by dissolving 50 mg of a polymer prepared in the same manner as in Example 3 in 2 ml of water and casting the resultant aqueous solution on a platinum foil by spin-casting method. An electrochemical cell was constructed by using the film-coated platinum foil as a working electrode, a platinum wire as a counter electrode, and a silver/silver ion electrode as a reference electrode. When this cell was electrically scanned at a room temperature in a 0.1 mol/liter tetrabutylammonium perchlorate/acetonitrile solution, to confirm the occurrence of the same $H^+$-popping as described in "J. Am. Chem. Soc.", 110, 2983 (1988). The detection of the release of $H^+$ indicates that the film possessed a self-doping function. Thus, the production of the polymer having the chemical structure represented by the formula (II) was accomplished.

Example 9

Conversion of the polymer having a chemical structure represented by the formula (I) to the polymer having a chemical structure represented by the formula (III).

A polymer film was manufactured by dissolving 100 mg of a polymer prepared in the same manner as in Example 1 in 2 ml of water and casting the resultant aqueous solution on a glass plate by spin-casting method. When iodine was allowed to affect this film in a gaseous phase, the color of the film changed from blue to light blackish gray. The electroconductivity (determined by four-probe method) at a room temperature rose from σ=5×10$^{-5}$ S/cm to σ=8×10$^{-1}$ S/cm. Thereafter, the film was separated from the glass plate and subjected to elementary analysis.

Elementary analyses (%) for $C_8H_3S_2O_3NAI_{0.3}$ Calculated: C; 35.25%, H; 1.10%, S; 23.49%, Na; 8.42%, I; 13.95% Found: C; 35.47%, H; 1.34%, S; 23.55%, Na; 7.98%, I; 13.74%

Example 10

Process for production of the polymer having a chemical structure represented by the formula (I) having H for both $R^1$ and $R^2$, $NR^3$ for X, $CH_3$ for $R^3$, and $Na^+$ for M.

To 4.0 ml of sulfuric acid containing 2.0 ml of fuming sulfuric acid (20% $SO_3$), 500 mg of N-methylisoindoline produced by the known method reported as in Adv. Heterocycl. Chem., 10, 113 (1969) was placed slowly added as stirred at a room temperature, and stirred continuously for five hours at a room temperature. When the resultant reaction mixture was then heated to 90° C. for three hours, the reaction solution exhibited a black color.

The reaction mixture was poured into 100 ml of methanol. The precipitate consequently formed was centrifugally separated. The solid centrifugate was dissolved in 100 ml of 0.5N aqueous sodium hydroxide solution, dialyzed to remove excess sodium sulfate and sodium hydroxide, then the dialyzed solution was allowed to evaporate under a reduced pressure to remove the solvent, and dried under vacuum, to obtain 380 mg of a black polymer.

IR: (KBr disk, cm$^{-1}$); 1803w, 1412w, 1314m, 1225w, 1194s, 1042s, 750s

Example 11

Process for production of the polymer having a chemical structure represented by the formula (I) having H for $R^1$, $O(CH_2)_9CH_3$ for $R^2$, S for X, and $Na^+$ for M.

To 8.0 ml of sulfuric acid containing 2.0 ml of fuming sulfuric acid (20% $SO_3$) kept at 0° C., 500 mg of 5-decyloxy-1,3-dihydroisothianaphthene produced by a known method as reported in JP-A-2-242816 was slowly added as stirred and then continuously stirred for one hour. When the resultant mixture was then heated to 90° C. for 30 minutes, the reaction solution turned black.

The resultant reaction mixture was poured into 100 ml of 0.5N aqueous NaOH/methanol solution and the precipitate was separated centrifugally. The solid centrifugate consequently obtained was dissolved in 100 ml of water, dialyzed to remove excess sodium sulfate, then the dialyzed solution was allowed to evaporate under a reduced pressure to remove the solvent, and dried under vacuum to obtain 150 mg of a black polymer. The UV spectrum of the produced polymer was similar to that obtained in Example 1.

Example 12

On the surface of a glass plate as a support, 10% by weight of an aqueous solution of a water-soluble conducting polymer prepared in the same manner as in Example 2 was applied and left drying thereon spontaneously. The applied layer of the polymer was dried under vacuum and separated from the glass plate, to obtain a free-standing film of about 20 μm in thickness. The electroconductivity of this film (determined with d four-terminal testing system) at a room temperature was a σ=1.4 S/cm. The conductivity of the film remained stable when it was kept in air for two months.

Example 13

On the surface of a glass plate as a support, an aqueous solution of 1% by weight of a water-soluble conducting polymer produced in the same manner as in Example 2 was applied by the use of a spin coater at a 35 room temperature and a revolution number of 1,000 rpm to form a thin film of about 0.05 μm in thickness (determined by the needle touch method called Dektak). This thin film exhibited good adhesiveness to the glass plate support and showed surface resistance of about $7.8 \times 10^5$ Ω/□. The transmittance of the film at 500 nm in a visible ray region was 96%. Thus, the polymer yielded a conducting film of extremely high transparency.

Thin films were prepared in the same manner as above except for the revolution number of a spin coater and the properties of the films obtained are 10 shown in Table 1.

TABLE 1

| Revolution Numbers (rpm) | Film Thickness (μm) | Surface Resistance (Ω/□) | Transmittance (%, at 500 nm) |
|---|---|---|---|
| 200 | 0.25 | $1.5 \times 10^5$ | 83 |
| 500 | 0.10 | $3.8 \times 10^5$ | 93 |
| 1000 | 0.05 | $7.8 \times 10^5$ | 96 |

Example 14

On the surface of a glass plate as a support, an aqueous solution containing 1% by weight of a water-soluble conducting polymer produced in the same manner as in Example 2 and 1% by weight of polyvinylalcohol (degree of polymerization of 500) was applied by the use of a spin coater at a room temperature at a revolution number of 1,000 rpm to form a thin film of about 1 μm in thickness, determined in the same manner as in Example 13. This thin film exhibited good adhesiveness to the glass plate support and showed surface resistance of about $1 \times 10^7$ Ω/□. The transmittance of the film at 500 nm in a visible ray region was 97%.

Example 15

The water-soluble conducting polymer produced in the same manner as in Example 2 was not only soluble in water but also in dimethylformamide (DMF), dimethylsulfoxide (DMSO), N-methylpyrrolidone (NMP) and methanol respectively.

Example 16

An aqueous solution containing 5% by weight of a water-soluble conducting polymer produced in the same manner as in Example 10 and 20% by weight of polyvinylalcohol (degree of polymerization of 2000) was placed in a Petri dish of a diameter of about 5 cm) and was allowed to evaporate to remove water and then dried under vacuum. A shaped plate (disc) of about 1 mm in thickness as formed in the dish was separated from the bottom of the dish. This shaped article showed surface resistance of about $8 \times 10^8$ Ω/□.

Example 17

An aqueous solution containing 10% by weight of a water-soluble conducting polymer produced in the same manner as in Example 1 and 12% by weight of polyvinylalcohol (degree of polymerization of 2000) was placed in a syringe having a muzzle diameter of about 1 mm, and the solution was slowly extruded into ethanol and kept for a day. A fibrous shaped article formed was then removed from the solvent, and dried to obtain blackish blue fiber. The fiber had electroconductivity of σ=$2 \times 10^{-6}$ S/cm, measured by four-probe method, at a room temperature. When iodine was allowed to affect this fiber in a gaseous phase in the same manner as in Example 9, the electroconductivity at a room temperature rose to σ=$5 \times 10^{-2}$ S/cm.

This fiber was drawn at a draw ratio of 1.5 at a room temperature, and the electroconductivity of the resultant fiber rose to 0.3 S/cm.

Example 18

On the surface of a glass plate as a support, an aqueous solution of a water-soluble conducting polymer produced in the same manner as in Example 2 and polyvinylalcohol (degree of polymerization of 500) as composed at various ratio was applied by the use of a spin coater at a room temperature and a revolution number of 1,000 rpm. The surface resistance of the thin films obtained is shown in Table 2.

TABLE 2

| Water-soluble Conducting Polymer | Polyvinylalcohol | Surface Resistance |
|---|---|---|
| 1 wt % | 1 wt % | $1 \times 10^7$ Ω/□ |
| 1 wt % | 5 wt % | $3 \times 10^7$ Ω/□ |
| 1 wt % | 10 wt % | $3 \times 10^8$ Ω/□ |

Example 19

Production of a compound represented by formula (X), which is a compound represented by formula (VI) wherein r in 0 ($R^4=R^5=R^6=H$, $X^1=X^2=X^3=X^4=H$, $M^1=Na^+$):

To 4 ml of a fuming sulfuric acid (20% $SO_3$) cooled to 20° C. or lower, 1 g of 1,3-dihydroisothianaphthene, which is a known compound, was gradually added with stirring, followed by stirring for 4 hours at a room temperature. The reaction mixture was poured into 150 ml of ice water, and thereto was added 20 g of sodium chloride to salt out sodium 1,3-dihydroisothianaphthene-5-sulfonate, which was then isolated by a centrifugal separator and vacuum dried to obtain 850 mg of a gray powder compound.

Example 20

Production of a polymer comprising a chemical structure represented by the following formula (XII), which is a formula represented by formula (VII) wherein r in 0 ($R^4=R^5=R^6=H$, $M=H^+$):

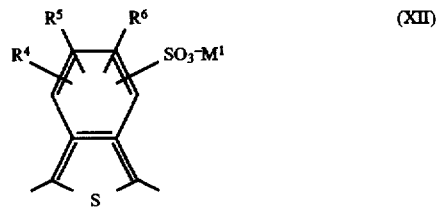

(XII)

To a mixed system of 5.5 g of ferric chloride, 1 ml of an aqueous solution of hydrogen peroxide (30%), and 10 ml of water, 1 g of sodium 1,3-dihydroisothianaphthene-5- sulfonate, produced in the same manner as in Example 19, was gradually added with stirring. After continuing stirring one day at a room temperature, a viscous black reaction solution was obtained.

The reaction mixture was vacuum dried, and then poured into 100 ml of acetone, and the precipitated polymer was separated by a centrifugal separator. After drying, the polymer was dissolved in 700 ml of a 0.1N aqueous NaOH solution, insoluble materials were removed by centrifugation, and impurities were removed by passing the solution through a 1-μm filter film. Further, $Na^+$ ions were converted into H by means of an H-type ion-exchange resin (Amberlite IR-120B). Water was distilled off from the aqueous solution, and the residue was vacuum dried to obtain 0.2 g of a blue polymer.

The substitution ratio of the sulfonic acid group of the repeating units in the polymer was determined by neutralization titration using alkali, and the polymer was found to consist of almost 100 mol % of the repeating units having substitution by the sulfonic acid group. The polymer was subjected to GPC measurement, and found to have a number-average molecular weight of 18,000 (calculated in terms of sodium polystyrenesulfonate as a molecular weight standard material).

Example 21

Figure 6:
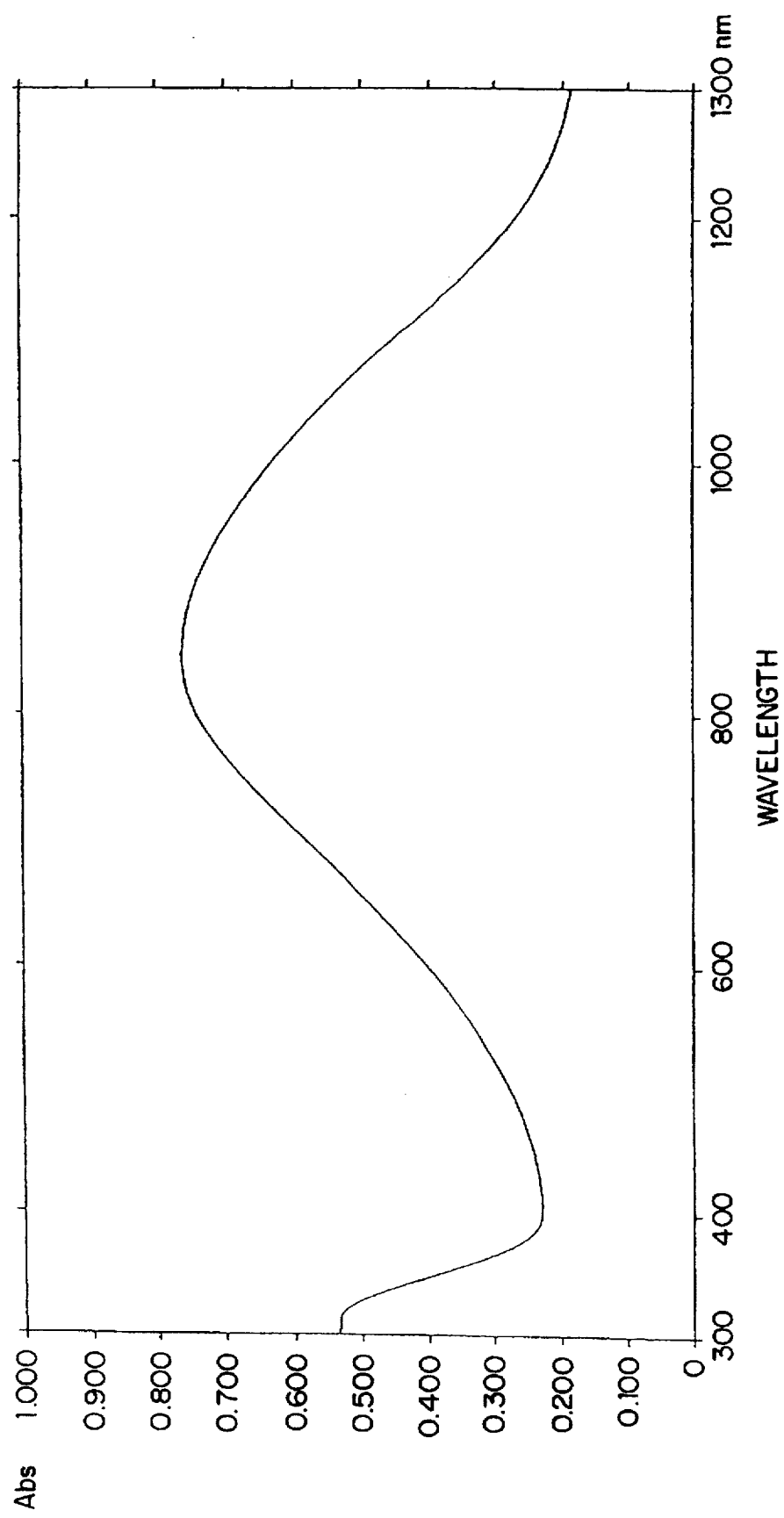
FIG. 6 is the visible near infrared absorption spectrum of the polymer obtained in Example 21.

Production of a polymer comprising a chemical structure represented by formula (IX), which is a formula represented by formula (VIII) wherein r is 0 ($R^4=R^5=R^6=H$, $M^1=Na^+$, p=0.8, q=0.2, Ar=1,3-isothianaphthenylene):

To 25 ml of sulfuric acid kept at 10° C. or lower, 1 g of sodium 1,3-dihydroisothianaphthene-5-sulfonate, produced in the same manner as in Example 19, was gradually added with stirring. After the stirring for 1 hour at room temperature, the reaction solution became reddish violet. The solution was then heated at 80° C. for 2 hours, and the resulting black reaction mixture was poured into 60 ml of 0.1N NaOH/MeOH. The precipitated polymer was isolated by a centrifugal separator, dissolved into 100 ml of water, and passed through a dialysis membrane to remove sodium sulfate as an impurity. After distilling off water from the aqueous solution, the residue was vacuum dried to obtain 0.3 g of a blue polymer. The visible near infrared absorption spectrum of the resulting polymer is shown in FIG. 6.

Elemental analysis for $(C_8H_3S_2O_3Na)_{0.8}(C_8H_4S)_{0.2}$:

|  | C | H | S | Na |
|---|---|---|---|---|
| Calcd. | 44.27 | 2.96 | 26.59 | 8.48 |
| Found | 44.52 | 3.23 | 26.41 | 8.92 |

Thereafter, in order to measure the substitution ratio of the sulfonic acid group of the repeating units in the polymer, 0.2 g of the resulting polymer was dissolved into water and converted from the $Na^+$ form to the $H^+$ form by means of an H-type ion-exchange resin (Amberlite IR-120B). After distilling off water from the aqueous solution, the residue was vacuum dried to obtain 120 mg of a blue polymer.

The substitution ratio of the sulfonic acid group was determined by neutralization titration, and the polymer was found to be a copolymer having an average molar fraction of 0.8 of the repeating unit having sulfonic acid substitution. This reveals that a part of the sulfonic acid split off during the polymerization reaction.

Example 22

Production of a polymer comprising a chemical structure represented by formula (IX), which is a formula represented by formula (VIII) wherein r in 0 ($R^4=R^5=R^6=H$, $M^1=H^+$, P=0.6, 9=0.4, Ar=1,3-isothianaphthenylene)

Figure 7:
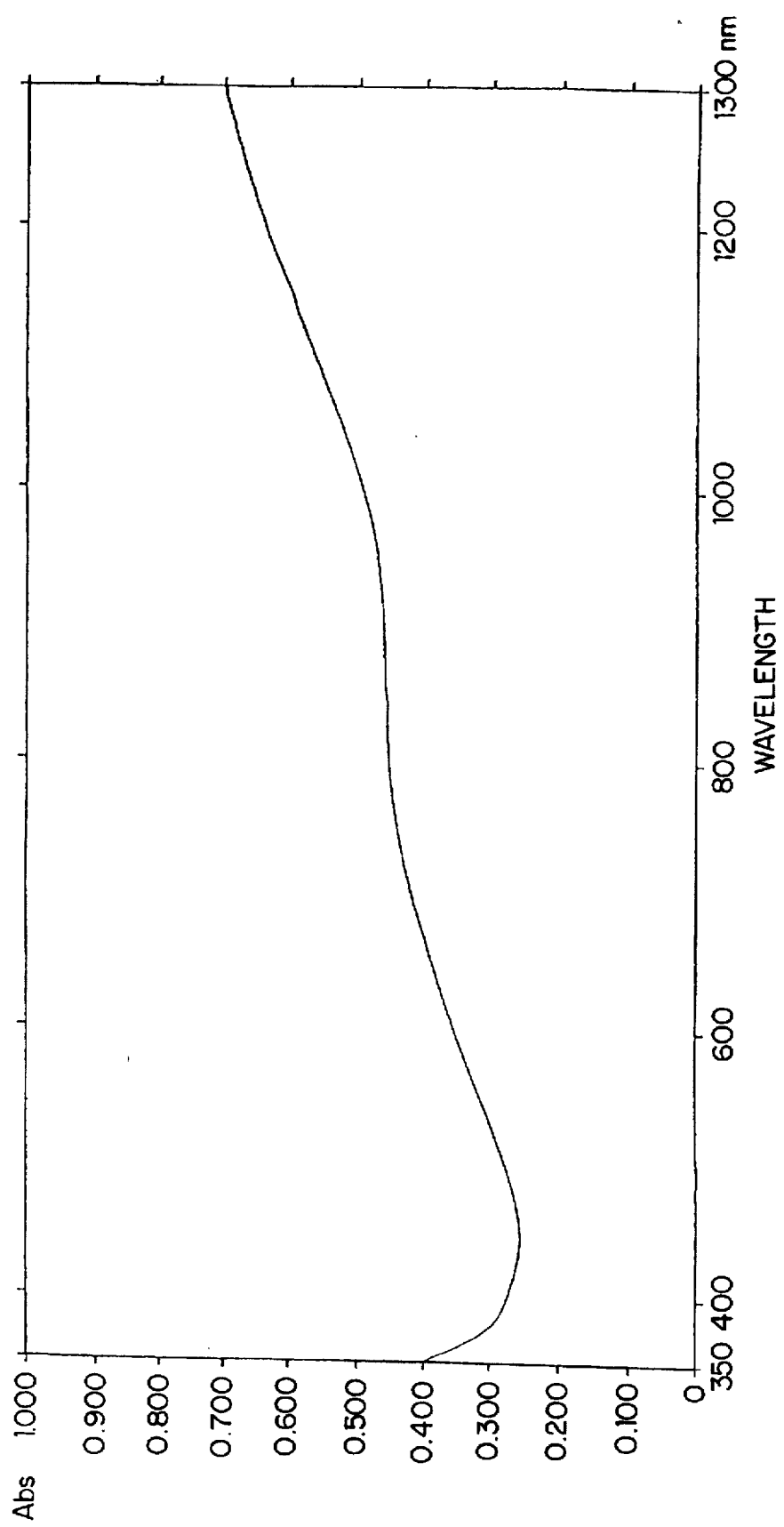
FIG. 7 is the visible near infrared absorption spectrum of the polymer obtained in Example 22.

To 5 ml of sulfuric acid kept at 10° C. or lower, 0.7 g of sodium 1,3-dihydroisothianaphthene-5-sulfonate, produced in the same manner as in Example 19, and 0.28 g of 1,3-dihydroisothianaphthene were gradually added with stirring. After the stirring for 1 hour at room temperature, the reaction solution turned violet, and when heated at 90° C. for 3 hours thereafter, the reaction solution changed to black. The resulting reaction mixture was poured into 60 ml of 0.1N NaOH/MeOH, and the precipitated polymer was isolated by a centrifugal separator. The polymer was dissolved into 100 ml of water, and passed through a dialysis membrane to remove sodium sulfate as an impurity. Then, the $Na^+$ ion was converted to $H^+$ by means of an H-type ion-exchange resin (Amberlite IR-120B). After distilling off water from the aqueous solution, the residue was vacuum dried to obtain 0.5 g of a blue polymer. The visible near infrared absorption spectrum of the resulting polymer is shown in FIG. 7.

The substitution ratio of the sulfonic acid group was determined by neutralization titration, and the polymer was found to be a copolymer having an average molar fraction of 0.6 of the repeating unit having sulfonic acid substitution.

Example 23

Production of a compound represented by formula (XI), which is a compound represented by formula (VI) wherein r is 1 (($R^4=R^5=R^6=H$, $X^1=X^2=X^3=X^4=H$, $M^1=Na^+$):

Example 19 was repeated except for using 1 g of 1,3-naphtho[2,3-c]thiophene, which is a known compound, in place of 1,3-dihydroisothianaphthene, and sulfonation was carried out on the resulting solution in the same manner as in Example 19 to obtain 420 mg of sodium 1,3-naphtho[2,3-c]thiophenesulfonate as a gray powder.

Example 24

Production of a polymer comprising a chemical structure represented by the following formula (XIII), which is a formula represented by formula (II) wherein r is 1 ($R^4=R^5=R^6=R^7=R^8=H$, $M^1=NH_4^+$):

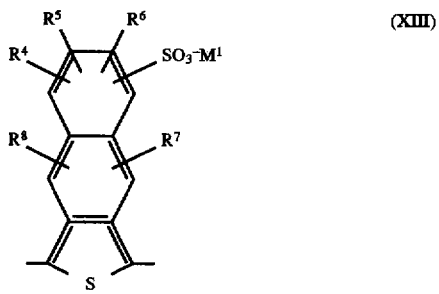

(XIII)

Example 20 was repeated except for using 700 mg of sodium 1,3-dihydronaphtho[2,3-c]thiophene-6-sulfonate, produced in Example 24, as a monomer in place of 1,3-dihydroisothianaphthene. Polymerization and subsequent procedures were conducted in the same manner as in Example 20, and 200 mg of an acid-form polymer was obtained. The sulfonic acid substitution ratio of the repeating

Figure 8:
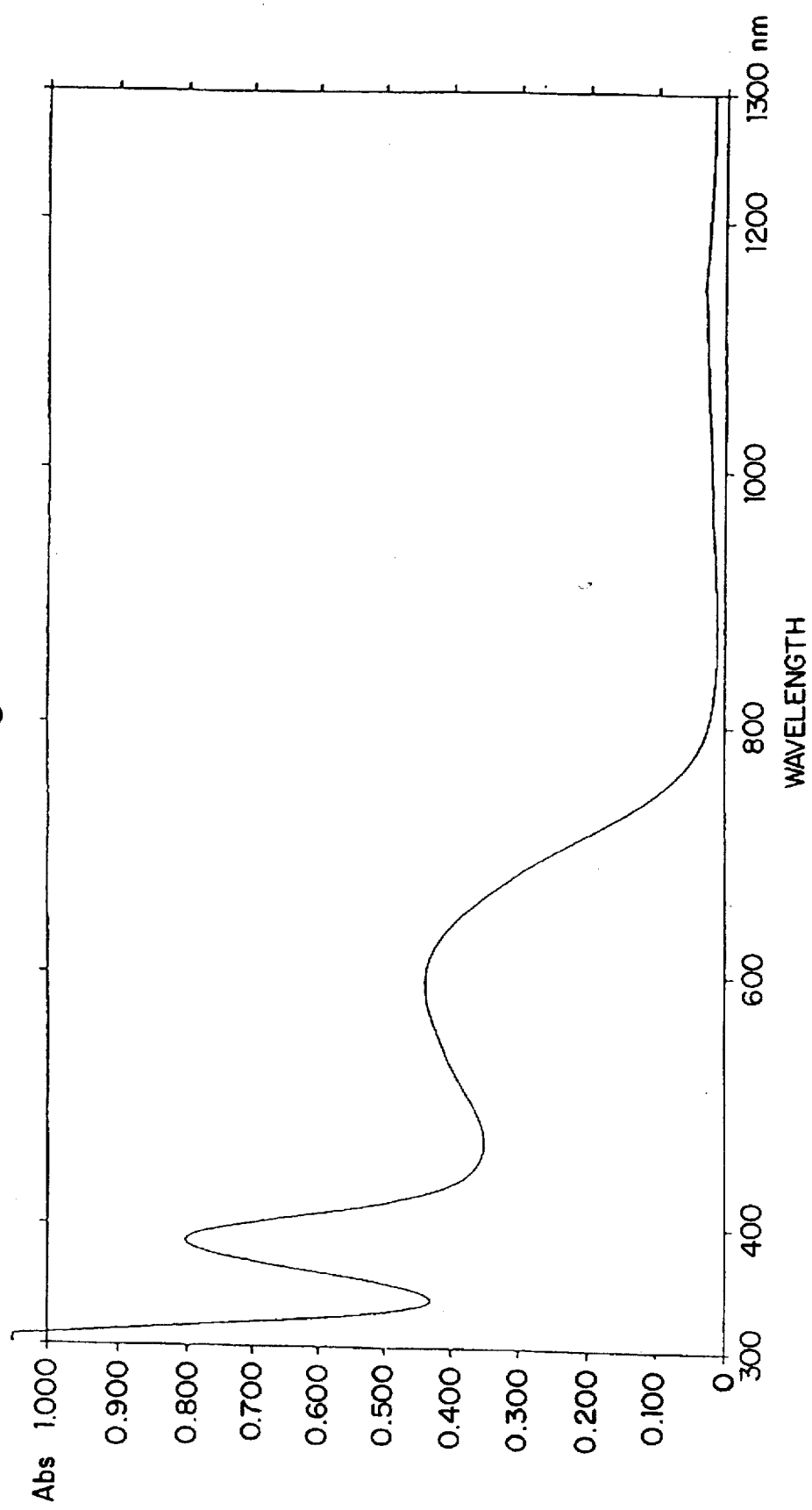
FIG. 8 is the visible near infrared absorption spectrum of the polymer obtained in Example 24.

27 units thereof was almost 100%. The polymer was dissolved in water, an excess amount of aqueous ammonium was added thereto, and the resulting mixture was distilled off under reduced pressure to obtain a polymer of an ammonium salt. The polymer was again dissolved in water and its visible near infrared absorption spectrum was measured. The results are shown in FIG. 8.

Example 25

Production of a compound represented by formula (X), which is a compound represented by formula (I) wherein r in 0 (($R^4=R^5=R^6=H$, $X^1=X^2=X^3=X^4=H$, $M^1=(CH_3)_3(n-C_8H_{17})N^+$:

3 g (12.7 mmol) of sodium 1,3-dihydroisothianaphthene-5-sulfonate was dissolved into 100 ml of purified water while keeping the temperature at 20° C., and thereto was added 3.20 g (12.7 mmol) of n-octyltrimethylammonium bromide (produced by Tokyo Kasei Co., Ltd.) with stirring. After 30 minutes, the mixture was extracted three times with chloroform (20 ml×3 times), and then the chloroform layer was dried over anhydrous sodium sulfate and distilled off under reduced pressure to obtain an ion complex form as an oily semisolid (gain: 4.35 g, yield: 89%). The polymer obtained was found to be soluble in-chloroform, toluene, dimethyl sulfoxide, tetrahydrofuran and dimethylformamide.

Example 26

Production of a polymer comprising a chemical structure represented by formula (X II), which is a formula represented by formula (VII) wherein r in 0, from a compound represented by formula (VI) wherein r in 0, $X^1$ and $X^3$ each is Cl, and $X^2$ and $X^4$ each is H (($R^4=R^5=R^6=H$, $M^1=Na^+$):

To 4.35 g of the ion complex form obtained in Example 25, 20 ml of a dry chloroform was added and 3.17 g (23.7 mmol) of N-chlorosuccinimide (NCS) was further added. At this time, ammonium 1,3-dichloroisothianaphthene-5-sulfonate was produced in the system but not isolated, and after heating the system under reflux for 2 hours, a black blue solution was obtained. After cooling, insoluble materials were removed from the reaction solution, the organic layer was dried under reduced pressure, and 200 ml of 0.1N NaOH was added to the solution to obtain a water-soluble polymer solution. The resulting solution was passed through an acidic ion-exchange column, and an acid-form aqueous polymer solution having a pH of 1.8 was obtained. The visible near infrared absorption spectrum of the resulting solution gave the same doped curve as in FIG. 7.

Example 27

An aqueous solution of a 10 wt % electroconductive polymer produced in the same manner as in Example 4 was coated on the surface of a glass plate as a substrate and dried. After further vacuum drying, the polymer layer was peeled off from the glass plate to obtain a self-standing film having a thickness of about 30 μm. The self-standing film had an electric conductivity (in a four-terminal measurement system) at room temperature of σ=5×10⁻² S/cm. The electric conductivity value of the self-standing film was constantly maintained in air at room temperature for 3 months.

Example 28

Production of a compound represented by formula (X), which is a compound represented by formula (VI) wherein r in 0 (($R^4=R^5=R^6=H$, $X^1=X^2=X^3=X^4=H$, $M^1=Na^+$):

To 8 ml of a sulfuric acid solution containing 2 ml of fuming sulfuric acid (20% $SO_3$) cooled to 20° C. or lower, 500 mg of 5-decyloxy-1,3-dihydroisothianaphthene, which is a known compound, was gradually added with stirring, followed by stirring for 3 hours at room temperature. The reaction mixture was poured into 100 ml of ice water, and thereto was added 14 g of sodium chloride to salt out sodium 5-decyloxy-1,3-dihydroisothianaphthene-6-sulfonate, which was then isolated by a centrifugal separator and vacuum dried to obtain 180 mg of a gray powder compound.

Example 29

Production of a polymer containing a chemical structure represented by the following formula (XII), which is a formula represented by formula (VII) wherein r in 0 (($R^4=C_{10}H_{21}$)—, $R^5=R^6=H$, $M^1=Na^+$):

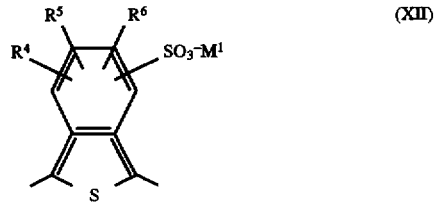

(XII)

To a mixture system of 600 mg of ferric chloride, 1 ml of water, 100 mg of sodium 5-decyloxy-1,3-dihydroisothianaphthene-6-sulfonate, was gradually added with stirring. After continuing stirring 30 min. at room temperature, a viscous black reaction mixture was obtained.

The reaction mixture was poured into 10 ml of acetone, and the precipitated polymer was separated by a centrifugal separator. After drying, the polymer was dissolved in 100 ml of a 0.1N aqueous NaOH solution, insoluble materials were removed by centrifugation, and impurities were removed by passing the solution through a 1-μm filter film. An alkaline solution containing the polymer was acidified with a 1N HCl solution to convert it into an H-type polymer. The aqueous solution was extracted with chloroform 3 times to provide 55 mg of the polymer after evaporation.

Example 30

On the surface of a glass plate as a support, an aqueous solution of 1% by weight of the water-soluble conducting polymer produced in the same manner as in Example 2 was applied by the use of a spin coater at room temperature and a revolution number of 1,000 rpm to form a thin film of about 0.05 μm in thickness (determined by the needle touch method called Dektak).

This thin film exhibited good adhesiveness to the glass plate support, and showed a surface resistance of about 7.6×10⁵ Ω/□. The transmittance of the film at 500 nm in the visible region was 96%. Thus, the polymer yielded an conducting film of extremely high transparency.

Thin films were prepared in the same manner as above except for the revolution number of the spin coater. The properties of the films obtained are shown in Table 3 below.

TABLE 3

| Revolution Numbers (rpm) | Film Thickness (μm) | Surface Resistance (Ω/□) | Transmittance (%, at 500 nm) |
|---|---|---|---|
| 500 | 0.10 | $4.2 \times 10^5$ | 93 |
| 1000 | 0.05 | $7.6 \times 10^5$ | 96 |

The electroconductive polymer produced according to the process of the present invention is a water-soluble and/or organic solvent-soluble electroconductive polymer having excellent processability. Accordingly, the polymer is useful in various electroconductive materials or optical materials which require a precise processing, such as an electrode, a sensor, an electronics display element, a non-linear optical element, a photoelectric conversion element, or an antistatic agent. Further, according to the process of the present invention, not only a homopolymer, but also a copolymer can be produced; where the compositions of the components constituting the π-conjugated main chain skeleton of the copolymer can be easily controlled. Furthermore, the polymer can have a self-doping function and a stable electric conductivity due to the sulfonic acid group contained in the polymer. Still further, the heteropolycyclic compound having a sulfonic acid substituent used as a starting material is very stable, and particularly useful for the efficient production of a polymer having a high electroconductivity under mild conditions.

The electroconductive polymer having a chemical structure represented by the formula (I), (II) or (III) of the present invention is water-soluble and is a polymer exhibiting high workability and possessing high electroconductivity. Thus, it is useful as electrodes, electronic display elements, nonlinear optical elements, optical conversion elements, antistatic materials, various conducting materials, and optical materials which are required to allow precision fabrication.

While the invention has been described in detail and with reference to specific embodiments thereof, it will be apparent to one skilled in the art that various changes and modifications can be made therein without departing from the spirit and scope thereof.

What is claimed is:

1. An electroconductive polymer comprising at least one structural unit represented by formula (VII), (VIII) or (IX) as a repeating unit:

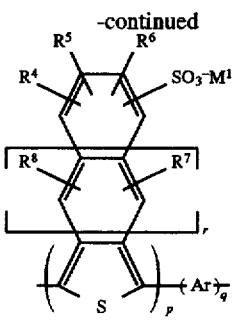

(VII)

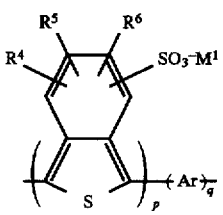

(VIII)

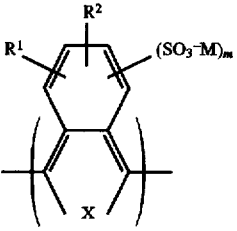

(IX)

wherein $R^4$, $R^5$, $R^6$, $R^7$ and $R^8$ each independently represents a monovalent member selected from the group consisting of a hydrogen atom, a linear or branched, saturated or unsaturated alkyl, alkoxy or alkyl ester group each having from 1 to 20 carbon atoms, $SO_3^-M^1$, a halogen atom, a nitro group, a cyano group, a primary, secondary or tertiary amino group, a trihalomethyl group, and a substituted or unsubstituted phenyl group wherein said substituted phenyl group is an alkyl-substituted phenyl group, with the proviso that two or more of $R^4$, $R^5$, $R^6$, $R^7$ and $R^8$ are not $SO_3^-M^1$ simultaneously, wherein two of $R^4$, $R^5$, $R^6$, $R^7$ and $R^8$ may combine with each other at any optional position to form at least one divalent chain which forms, together with two carbon atoms of the ring substituted with $R^4$–$R^8$ at least one 3- to 7-membered saturated or unsaturated hydrocarbon ring structure, and the alkyl group, the alkoxy group, or the alkyl ester group represented by $R^4$, $R^5$, $R^6$, $R^7$ and $R^8$ may optionally include a carbonyl, ether, ester, amide, sulfide, sulfinyl, sulfonyl or imino moiety; $M^1$ represents $H^+$, an alkali metal ion, or a cation of a Vb Group element unsubstituted or substituted with an alkyl group having from 1 to 30 carbon atoms, or with an aryl group having from 6 to 30 carbon atoms; Ar represents a repeating unit of a π-electron conjugated system having no sulfonic acid group; r represents an integer of from 0 to 3, and indicates the number of condensed rings enclosed by the thiophene ring and the benzene ring having substituents $R^4$, $R^5$ and $R^6$, wherein the condensed ring in the formula may optionally contain a nitrogen atom or an N-oxide group; and p and q represent molar fractions of the respective repeating units in the copolymer and thus do not denote a block copolymer.

2. An electroconductive polymer comprising repeating structural units represented by the formula (I):

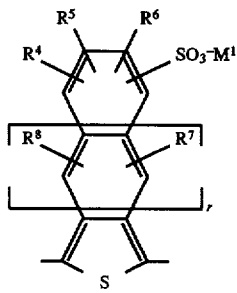

(I)

wherein $R^1$ and $R^2$ independently represent a hydrogen atom, a linear or branched alkyl or alkoxy group having 1 to 20 carbon atoms, a primary, secondary or tertiary amino group, a trihalomethyl group, a phenyl group or a substituted phenyl group wherein said substituted phenyl group is an alkyl-substituted phenyl group, X represents S, O, Se, Te or $NR^3$, $R^3$ represents a hydrogen atom, a linear or branched alkyl group having 1 to 6 carbon atoms or a substituted or unsubstituted aryl group wherein said substituted aryl group is an alkyl-substituted aryl group, providing that the chain in the alkyl group of $R^1$, $R^2$ or $R^3$ or in the alkoxy group of $R^1$ or $R^2$ optionally contains a carbonyl, ether or amide moiety, M represents $H^+$, an alkali metal ion or a cation and m represents a numerical value in the range between 0.2 to 2.

3. A shaped article comprising the electroconductive polymer of claim 1.

4. A shaped article comprising the electroconductive polymer of claim 2.

* * * * *